(12) United States Patent
Nakamura et al.

(10) Patent No.: US 9,214,035 B2
(45) Date of Patent: *Dec. 15, 2015

(54) IMAGE PROCESSING DEVICE, IMAGE PROCESSING METHOD, AND PROGRAM

(71) Applicant: Sony Corporation, Tokyo (JP)

(72) Inventors: Yusuke Nakamura, Chiba (JP); Shinichiro Gomi, Tokyo (JP); Masaru Suzuki, Tokyo (JP)

(73) Assignee: Sony Corporation (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/571,480

(22) Filed: Dec. 16, 2014

(65) Prior Publication Data

US 2015/0104099 A1    Apr. 16, 2015

Related U.S. Application Data

(63) Continuation of application No. 13/783,752, filed on Mar. 4, 2013, now Pat. No. 8,942,448.

(30) Foreign Application Priority Data

Mar. 14, 2012    (JP) .................................. 2012-056747

(51) Int. Cl.
    *G06K 9/00*    (2006.01)
    *G06T 11/60*   (2006.01)
    *G06T 5/00*    (2006.01)
    *G06T 7/00*    (2006.01)
    *G06T 7/40*    (2006.01)
    *G01J 4/00*    (2006.01)

(52) U.S. Cl.
    CPC ............ *G06T 11/60* (2013.01); *G06K 9/00362* (2013.01); *G06T 5/005* (2013.01); *G06T 7/0081* (2013.01); *G06T 7/40* (2013.01); *G06T 7/408* (2013.01); *G06T 2207/30196* (2013.01)

(58) Field of Classification Search
    USPC ......... 382/100, 103, 128–134, 162, 168, 173, 382/181, 194, 219, 232, 254, 274, 291, 305, 382/312, 165; 378/21, 70; 345/419; 356/369

See application file for complete search history.

(56) References Cited

U.S. PATENT DOCUMENTS

| | | | | |
|---|---|---|---|---|
| 7,006,223 B2 * | 2/2006 | Mullani | ........................ | 356/369 |
| 7,689,016 B2 * | 3/2010 | Stoecker et al. | .............. | 382/128 |
| 2004/0264749 A1 * | 12/2004 | Skladnev et al. | .............. | 382/128 |
| 2012/0313937 A1 * | 12/2012 | Beeler et al. | .................. | 345/419 |
| 2013/0279776 A1 * | 10/2013 | Guissin et al. | ................. | 382/128 |

FOREIGN PATENT DOCUMENTS

JP    2010-082245 A    4/2010

* cited by examiner

*Primary Examiner* — Seyed Azarian
(74) *Attorney, Agent, or Firm* — Lerner, David, Littenberg, Krumholz & Mentlik, LLP

(57) ABSTRACT

There is provided an image processing device including a body hair detection unit that detects a body hair region corresponding to body hair from a process target image that includes skin, a texture structure estimation unit that estimates a structure of skin texture in the process target image, and an interpolation unit that interpolates the body hair region detected by the body hair detection unit based on the structure of the skin texture estimated by the texture structure estimation unit.

12 Claims, 20 Drawing Sheets

311

IMAGE PROCESSING DEVICE, IMAGE PROCESSING METHOD, AND PROGRAM

CROSS-REFERENCE TO RELATED APPLICATION

The present application is a continuation of U.S. patent application Ser. No. 13/783,752, filed, Mar. 4, 2013 which claims priority from Japanese Patent Application No. JP 2012-056747 filed in the Japanese Patent Office on Mar. 14, 2012, the entire contents of which are incorporated herein by reference.

BACKGROUND

The present technology relates to an image processing device, an image processing method, and a program to remove body hair from a process target image that includes skin while a structure of skin texture is considered.

In the related art, detection of a body hair region from a skin image is performed. In JP 2010-82245A, for example, by setting a most frequent value of a grayscale image as a threshold value, a value that is equal to or higher than the most frequent value is determined to be skin, and a value that is less than the most frequent value is determined to be body hair.

SUMMARY

However, the color of human body hair in and skin considerably varies according to race. Thus, when determination of body hair is made by setting a most frequent value of a grayscale image as a threshold value, it is assumed that detection of the body hair will not be performed well due to the method of creating the grayscale image. In addition, when the texture of skin is analyzed, or the like, it is desirable that body hair be not included in a skin image. However, if body hair is removed from the skin image by performing detection of the body hair, an image in which a texture state is not shown in body hair portions is obtained.

Thus, this technology is directed to provide an image processing device, an image processing method, and a program which can remove body hair from a process target image that includes skin while a structure of skin texture is considered.

According to a first embodiment of the present disclosure, there is provided an image processing device including a body hair detection unit that detects a body hair region corresponding to body hair from a process target image that includes skin, a texture structure estimation unit that estimates a structure of skin texture in the process target image, and an interpolation unit that interpolates the body hair region detected by the body hair detection unit based on the structure of the skin texture estimated by the texture structure estimation unit.

In the embodiment of the present technology, the body hair region corresponding to body hair is detected from a process target image that includes skin by the body hair detection unit. The body hair detection unit decides, for example, a color conversion coefficient that makes color separation of the body hair region from another region easy, performs color conversion on the process target image using the color conversion coefficient, and generates color distribution information from the process target image that has undergone the color conversion. As the color conversion coefficient, a coefficient that has few errors in detecting the body hair region is used. The body hair detection unit decides a first threshold value for distinguishing a body hair pixel from a skin pixel based on the color distribution information, compares each pixel value of the process target image that has undergone the color conversion to the first threshold value, and detects the body hair region, and thereby generating body hair distribution information. The color conversion coefficient and the first threshold value are decided for, for example, for each race. In addition, region extension is performed so that body hair removal can be more reliably performed on the detected body hair region.

The texture structure estimation unit estimates the structure of skin texture in the process target image. The texture structure estimation unit may decide a second threshold value for distinguishing a skin ridge pixel from a skin groove pixel, determine whether a skin pixel is a skin ridge pixel or a skin groove pixel in a determination region with a pixel of interest in the body hair region regarded as a reference using the second threshold value, and estimate whether the pixel of interest is a skin ridge pixel or a skin groove pixel according to a proportion of the skin ridge pixel to the skin groove pixel within the determination region. Further, the second threshold value is decided based on the estimation result obtained by estimating distribution of the skin ridge pixel and distribution of the skin groove pixel from distribution of luminance of the skin pixel in the process target image.

The interpolation unit interpolates the body hair region detected by the body hair detection unit based on the structure of the texture estimated by the texture structure estimation unit. When the pixel of interest is estimated to be a skin ridge pixel, the interpolation unit may perform interpolation on the pixel of interest using a skin ridge pixel in a peripheral region of the pixel of interest, and when the pixel of interest is estimated to be a skin groove pixel, the interpolation unit may perform interpolation on the pixel of interest using a skin groove pixel in the peripheral region. The interpolation unit may set a region size of the peripheral region according to a body hair width at a position of the pixel of interest. With regard to the body hair width, for example, by determining a body hair main direction at the position of the pixel of interest, the size of the body hair region in a direction orthogonal to the body hair main direction is set as the body hair width. The size of the body hair region is determined based on, for example, the number of body hair pixels consecutive with the pixel of interest within a direction determination region set with reference to the pixel of interest.

According to a second embodiment of the present disclosure, there is provided an image processing method including detecting a body hair region corresponding to body hair from a process target image that includes skin, estimating a structure of skin texture in the process target image, and interpolating the detected body hair region based on the estimated structure of the texture.

According to a third embodiment of the present disclosure, there is provided a program for causing a computer to execute an image process for a process target image that includes skin, the program causing the computer to execute detecting a body hair region corresponding to body hair from the process target image, estimating a structure of skin texture in the process target image, and interpolating the detected body hair region based on the estimated structure of the texture.

Note that the program of the embodiment of the present technology is a program that can be provided using a storage medium and a communication medium that are provided to a general-purpose computer that can execute various program codes in a computer-readable form, for example, a storage medium such as an optical disc, a magnetic disk, a semiconductor memory or a communication medium such as a network. By providing the program in the computer-readable form, a process according to the program is realized on a computer.

According to the embodiments of the present disclosure described above, a body hair region corresponding to body hair is detected from a process target image that includes skin. In addition, a structure of skin texture in the process target image is estimated. The detected body hair region is interpolated based on the estimated structure of the texture. For this reason, removal of the body hair from a skin image can be performed while a texture structure of the skin is considered.

DETAILED DESCRIPTION OF THE EMBODIMENT(S)

Figure 1:
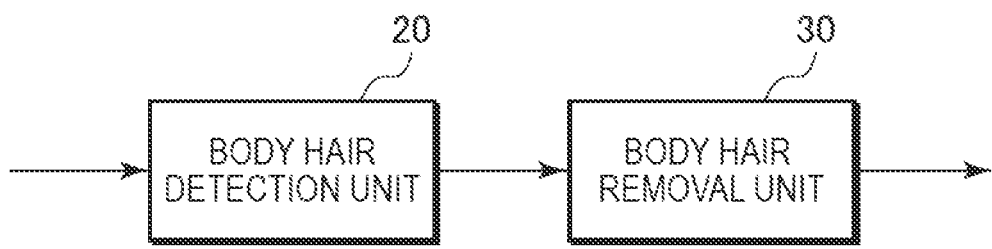
FIG. 1 is a diagram showing a configuration of an image processing device.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Hereinafter, preferred embodiments of the present disclosure will be described. Note that description will be provided in the following order.

1. Configuration of an Imaging Processing System
2. First Embodiment
   2-1. Configuration of a Body Hair Detection Unit
   2-2. Operation of the Body Hair Detection Unit
   2-3. Configuration of a Body Hair Removal Unit
   2-4. Operation of a Body Hair Removal Unit
3. Second Embodiment
   3-1. Configuration and Operation of a Body Hair Detection Unit
   3-2. Configuration of a Body Hair Removal Unit
   3-3. Operation of a Body Hair Removal Unit
4. Other Embodiment 1. Configuration of an Imaging Processing System FIG. 1 shows a configuration of an image processing device according to the embodiment of the present technology. The image processing device 10 removes body hair from a skin image photographed by an imaging device or from a skin image stored in an image recording device, or the like, while considering the structure of skin texture.

The imaging device outputs, for example, a skin image obtained by photographing an epidermis of skin to the image processing device 10. The imaging device is not limited to a specific type of an imaging device, and can employ an arbitrary type of an imaging device. The imaging device includes a microlens that can perform photographing to the extent that the state of skin texture can be recognized. Note that the imaging device desirably includes a focus adjustment function, a light source that can radiate illuminating light to a subject, an attachment that causes the tip of the lens to come in close contact with skin and the device to be fixed to a focus position so as to be able to perform photographing every time, and the like. In addition, the imaging device may be configured to be in one body with the image processing device 10, or to be separated therefrom.

The image processing device 10 has a body hair detection unit 20 and a body hair removal unit 30. The body hair detection unit 20 detects a body hair region corresponding to body hair from a process target image that includes skin, and then outputs the detection result to the body hair removal unit 30. For example, the body hair detection unit 20 generates a map showing a body hair region, and outputs the map to the body hair removal unit 30 as a detection result. The body hair removal unit 30 removes body hair detected by the body hair detection unit 20 from the process target image in a state in which a texture structure is retained. The body hair removal unit 30 has a texture structure estimation section and an interpolation section. The body hair removal unit 30 estimates the structure of skin texture in the process target image using the texture structure estimation section thereof. In addition, the body hair removal unit 30 interpolates the body hair region detected by the body hair detection unit 20 using the interpolation section thereof based on a structure of the texture estimated by the texture structure estimation section.

2. First Embodiment 2-1. Configuration of the Body Hair Detection Unit

Figure 2:
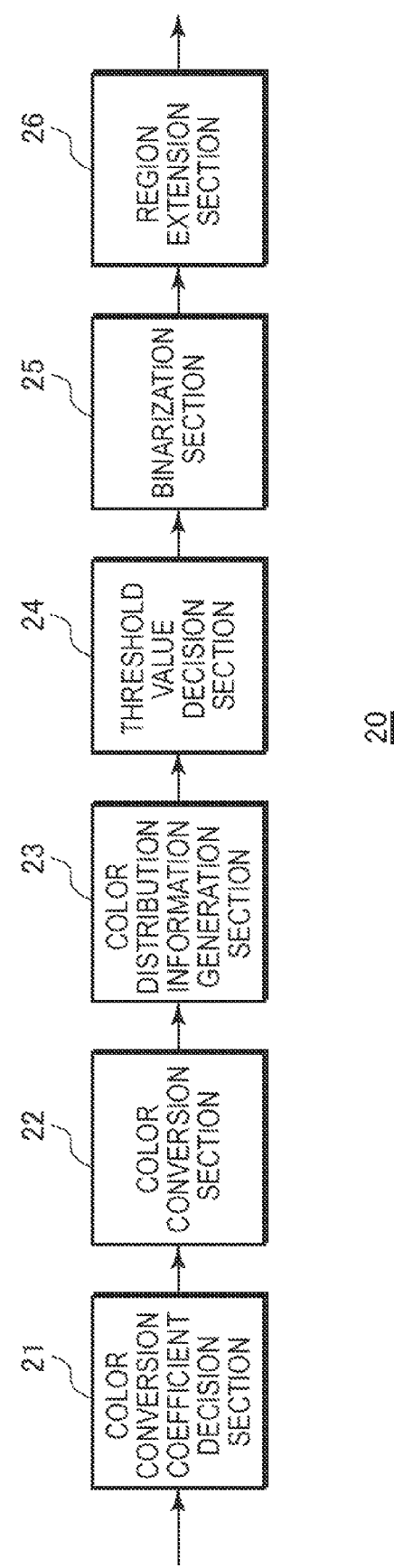
FIG. 2 is a diagram showing a configuration of a body hair detection unit.

FIG. 2 shows a configuration of the body hair detection unit. The body hair detection unit 20 is configured to include a color conversion coefficient decision section 21, a color conversion section 22, a color distribution information generation section 23, a threshold value decision section 24, a binarization section 25, and a region extension section 26.

The color conversion coefficient decision section 21 decides a color conversion coefficient so that the error rate of body hair detection becomes the minimum. The color conversion coefficient decision section 21 outputs the decided color conversion coefficient to the color conversion section 22.

The color conversion section 22 performs color conversion on a process target image using the color conversion coefficient decided by the color conversion coefficient decision section 21 so as to generate a color conversion image in which the color of skin and the color of body hair are easily distinguished from each other and then to output the color conversion image to the color distribution information generation section 23.

The color distribution information generation section 23 generates color distribution information indicating a distribution state of the colors of the skin and the body hair from the color conversion image. The color distribution information generation section 23 generates, for example, a histogram or a cumulative histogram as color distribution information using pixel values of the color conversion image.

The threshold value decision section 24 decides a body hair determination threshold value (first threshold value) to assort the color conversion image into pixels of the color of the skin and pixels of the color of the body hair based on the color distribution information generated in the color distribution information generation section 23. When a histogram or a cumulative histogram is generated using the pixel values of the color conversion image, frequencies of the color of the skin and the color of the body hair increase. In addition, in the color conversion image, color conversion is performed so that distinguishing the color of the skin from the color of the body hair becomes easy. Thus, based on the histogram or the cumulative histogram, a body hair determination threshold value that causes the color conversion image to be assorted into pixels of the color of the skin and pixels of the color of the body hair can be easily and appropriately decided. The threshold value decision section 24 outputs the decided body hair determination threshold value to the binarization section 25.

The binarization section 25 performs a binarization process on the color conversion image using the body hair determination threshold value supplied from the threshold value decision section 24. The binarization section 25 compares each pixel value of the color conversion image to the body hair determination threshold value and then sets, for example, a pixel of which the pixel value is lower than or equal to the body hair determination threshold value to be a body hair pixel, and a pixel of which the pixel value is greater than the body hair determination threshold value to be a skin pixel. In other words, the binarization section 25 generates a body hair map (binary map) which indicates whether each pixel of the process target image input to the body hair detection unit 20 is either of a skin pixel or a body hair pixel.

The region extension section 26 performs a region extension process on the body hair map generated in the binarization section 25. The region extension section 26 performs a process of extending a region that is determined to be a body hair pixel, in other words, a process in which a body hair width in the process target image is extended to be, for example, a predetermined width so that the body hair removal unit 30 can more reliably remove body hair from the process target image.

2-2. Operation of the Body Hair Detection Unit

Next, an operation of the body hair detection unit 20 will be described. Note that, in the description below, a process target image processed in the image processing device 10 is set to be, for example, an image with three principle colors generated in an imaging device which includes RGB color filters.

The body hair detection unit 20 detects a body hair region corresponding to body hair from a process target image that includes skin. The body hair detection unit 20 generates a color conversion image by performing color conversion using a color conversion coefficient decided so that, for example, the error rate of body hair detection becomes the minimum, and then generates a body hair map that indicates that each pixel of the color conversion image is either a skin pixel or a body hair pixel as a detection result of the body hair region.

Figure 3:
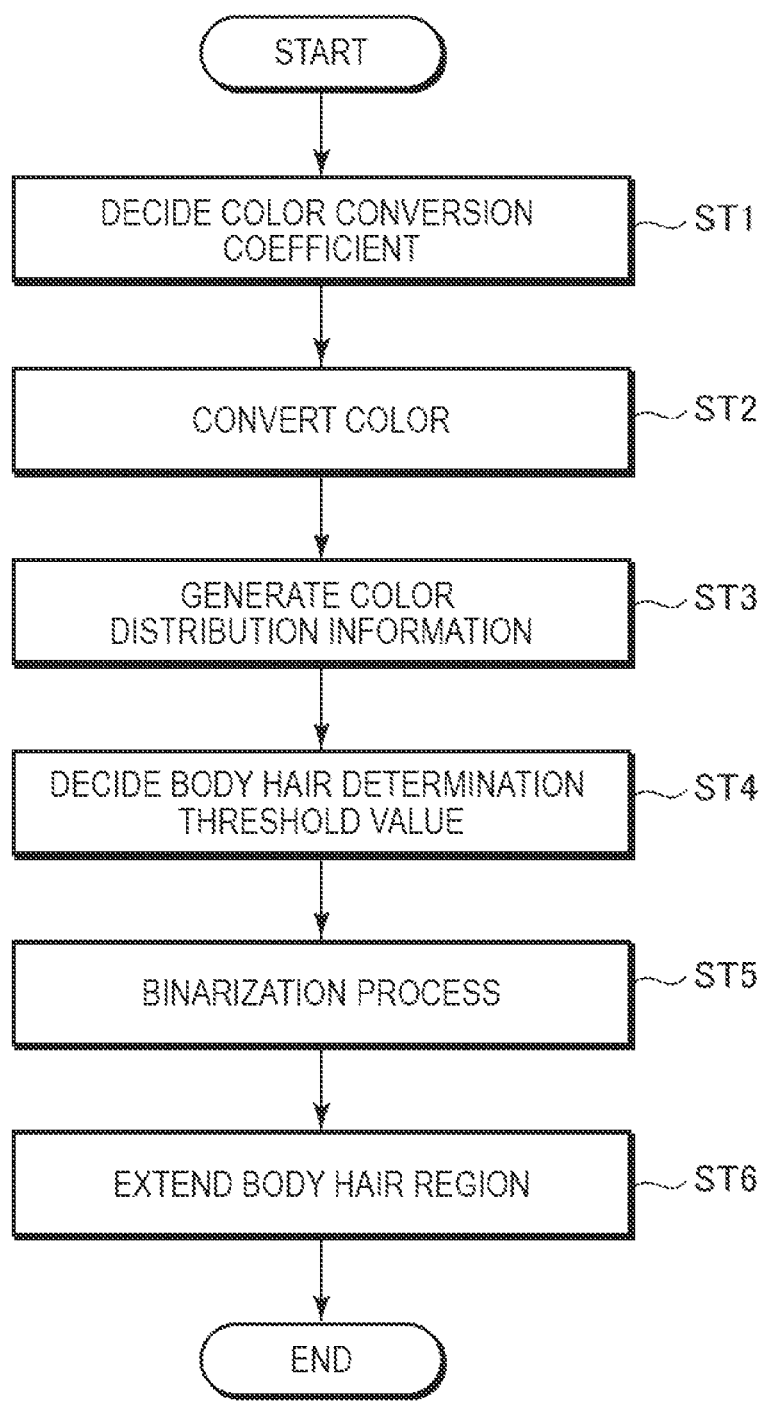
FIG. 3 is a flowchart showing an operation of the body hair detection unit.

FIG. 3 is a flowchart showing an operation of the body hair detection unit. In Step ST1, the body hair detection unit 20 decides color conversion coefficients. The color conversion coefficient decision section 21 of the body hair detection unit 20 decides the color conversion coefficients so that the error rate of body hair detection becomes the minimum, and then the process proceeds to Step ST2.

Herein, when three pieces of principle color image data of the process target image are set to be "R, G, and B," weighting is performed for each color, and image data "$Color_i$" that has undergone color conversion is set to be the value shown in Formula (1).

$$Color_i = \alpha_i^R \times R + \alpha_i^G \times G + \alpha_i^B \times B \quad (1)$$

Note that, in Formula (1), "$\alpha_i^R$" is a weight of red image data, "$\alpha_i^G$" is a weight of green image data, and "$\alpha_i^B$" is a weight of blue image data, which are set so as to satisfy the condition of Formula (2).

$$\alpha_i^R + \alpha_i^G + \alpha_i^B = 1 \quad (2)$$

Thus, the color conversion coefficient decision section 21 decides the color conversion coefficients so that the error rate of body hair detection becomes the minimum, in other words, the weights "$\alpha_i^R$" and "$\alpha_i^G$."

Figure 4:
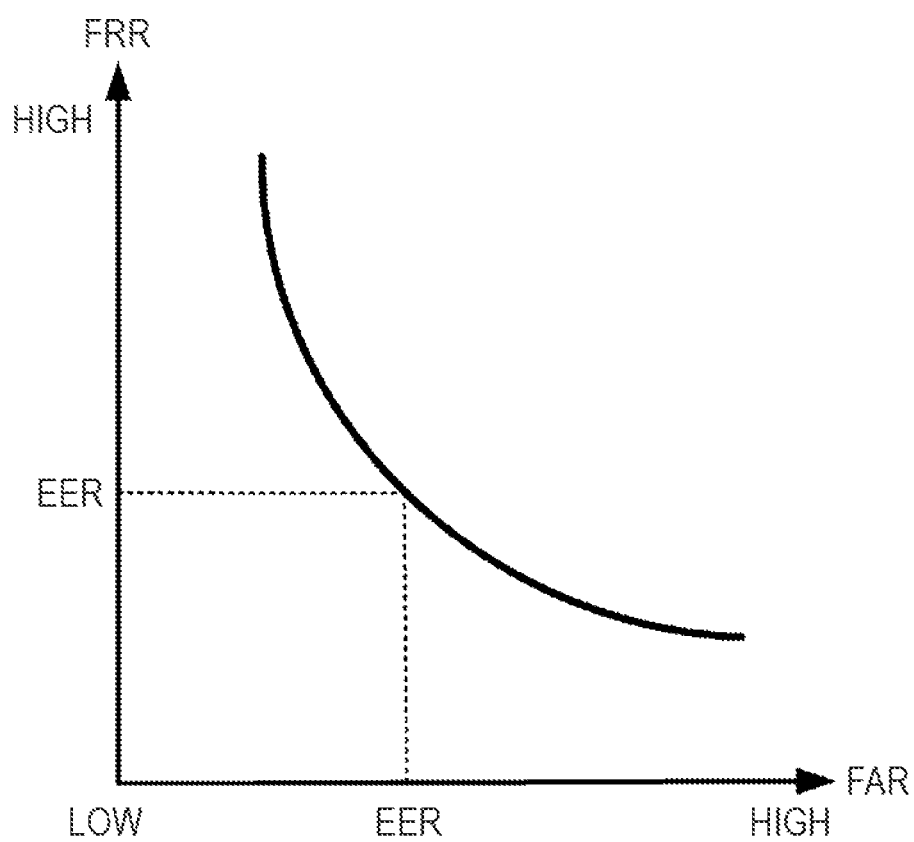
FIG. 4 is a diagram for describing a minimum error rate.

With regard to the error rate of body hair detection, correct data is created in advance, for example, from a skin image of a subject. Next, the weights "$\alpha_i^R$" and "$\alpha_i^G$" are changed to perform body hair detection, and the error rate is computed based on the difference between the result of the body hair detection and the correct data. As the error rate, for example, an FAR (False Acceptance Rate), or an FRR (False Rejection Rate) is computed. In addition, by setting the value of an EER (Equal Error Rate) when an FAR is not equal to an FRR as shown in FIG. 4 to be the minimum error rate, the weights "$\alpha_i^R$" and "$\alpha_i^G$" at this moment are set to be color conversion coefficients with which the error rate of body hair detection becomes the minimum. Further, the color of skin and the color of body hair vary depending on races. Thus, as a race is indicated by a coefficient "i," color conversion coefficients with which the error rate of body hair detection becomes the minimum are decided for each race.

In Step ST2, the body hair detection unit 20 performs color conversion. The color conversion section 22 of the body hair detection unit 20 performs the color conversion using the decided color conversion coefficients, and then the process proceeds to Step ST3. The color conversion section 22 performs calculation of Formula (3) using the decided color conversion coefficients so as to compute image data "$Color_i$" of the color conversion image.

$$Color_i = \alpha_i^R \times R + \alpha_i^G \times G + (1 - \alpha_i^R - \alpha_i^G) \times B \quad (1)$$

Figure 5:
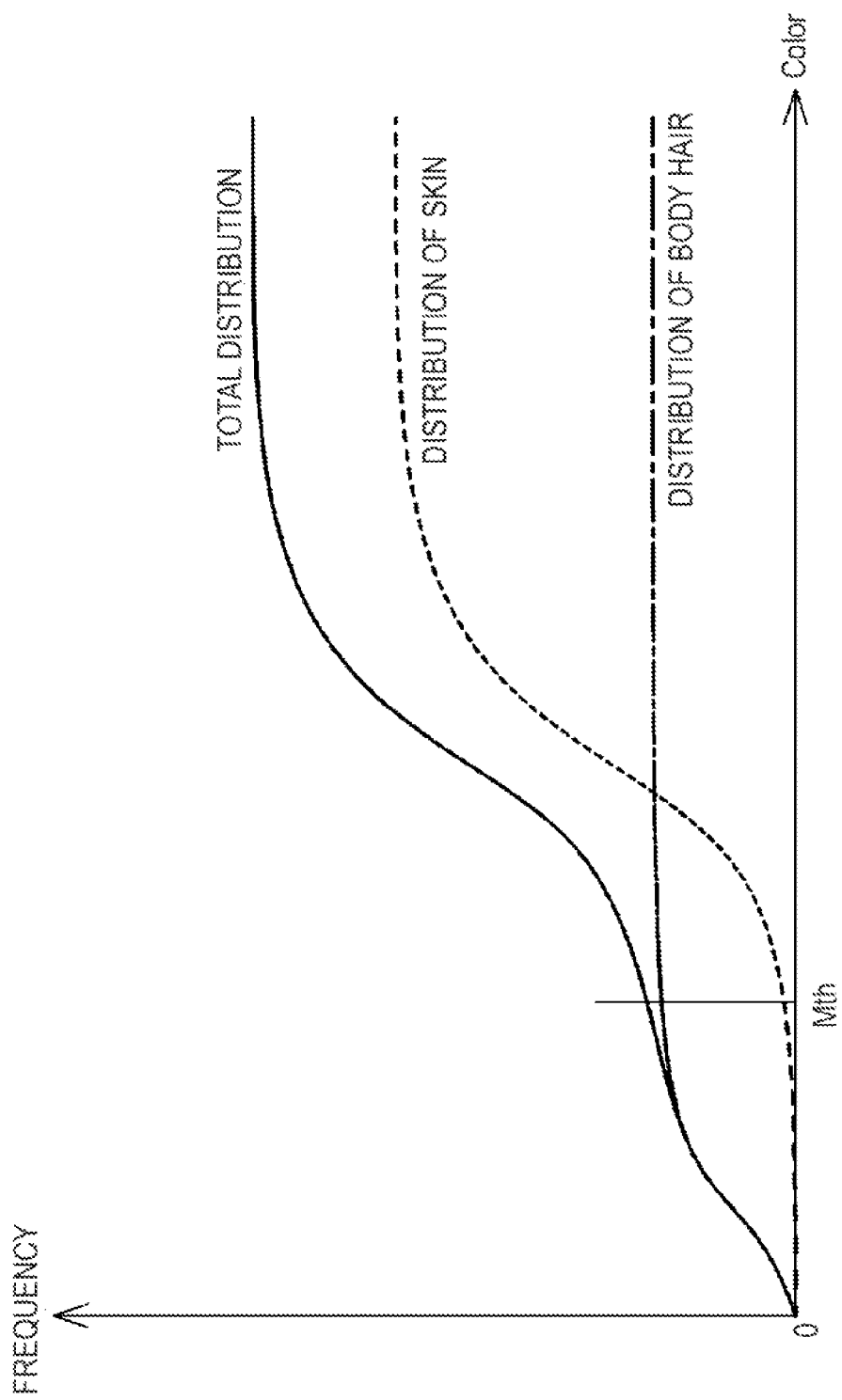
FIG. 5 is a diagram exemplifying a cumulative histogram.

In Step ST3, the body hair detection unit 20 performs generation of color distribution information. The color distribution information generation section 23 of the body hair detection unit 20 generates color distribution information indicating distribution of the image data "$Color_i$" of the color conversion image, for example, a cumulative histogram, and then the process proceeds to Step ST4. FIG. 5 exemplifies a cumulative histogram. For example, when the color of body hair is converted into substantially the color of "$Color_i$-h" through color conversion, the frequency of pixels indicating the body hair forms the distribution as indicated by the dashed line. In addition, when the color of skin is converted into substantially the color of "$Color_i$-s" through color conversion, the frequency of pixels indicating the skin forms the distribution as indicated by the dotted line. Thus, the cumulative histogram forms the distribution indicated by the solid line which is obtained by adding the distribution of pixels indicating the body hair to the distribution of pixels indicating the skin.

In Step ST4, the body hair detection unit 20 decides a body hair determination threshold value. The threshold value decision section 24 of the body hair detection unit 20 decides a body hair threshold value (first threshold value) for distinguishing the pixels of the color of the body hair from the pixels of the color of the skin based on the color distribution information, and then the process proceeds to Step ST5.

When a histogram or a cumulative histogram is generated using the color conversion image, the frequencies of the color of the skin and the color of the body hair increase. In addition, in the color conversion image, color conversion is performed so that distinguishing the color of the body hair from the color of the skin is easier. Thus, the body hair determination threshold value for distinguishing the pixels of the color of the body hair from the pixels of the color of the skin in the color conversion image can be easily and appropriately decided.

For example, a value at the time when the weights "$\alpha_i^R$" and "$\alpha_i^G$" are changed and the error rate of body hair detection thereby becomes the minimum is used. In addition, if the threshold value in this case is set to "$th_i$," the frequency of the threshold value "$th_i$" in a histogram is set to "$f(th_i)$," and the total cumulative frequency is set to "$f(all_i)$," the ratio $ThRatio_i$ of the frequency of the histogram can be shown as Formula (4). Thus, the threshold value decision section 24 decides the image data "Colon" when the cumulative frequency in the cumulative histogram becomes the ratio $ThRatio_i$ as a body hair determination threshold value Mth.

[Math. 1]

$$ThRatio_i = \frac{f(th_i)}{f(all_i)} \quad (4)$$

In Step ST5, the body hair detection unit 20 performs a binarization process. The binarization section 25 of the body hair detection unit 20 compares the body hair determination threshold value Mth to pixel values of each pixel in the color conversion image to generate a body hair map (a binary map), and then proceeds to Step ST6. The binarization section 25 performs binarization as shown in, for example, Formula (5), to generate the body hair map. For example, the binarization section 25 sets the pixel value of a pixel position Map (X, Y) to be "255" when data Color (X, Y) of a pixel position (X, Y) is lower than or equal to the body hair determination threshold value Mth, and sets the pixel value to be "0" when the data is greater than the body hair determination threshold value Mth. In this manner, the binarization section 25 generates the body hair map showing the distribution of the body hair pixels of the process target image.

[Math. 2]

$$Map(x, y) = \begin{cases} 255 & (Color(x, y) \le Mth) \\ 0 & (Color(x, y) > Mth) \end{cases} \quad (5)$$

In Step ST6, the body hair detection unit 20 performs extension of a body hair region. The region extension section 26 of the body hair detection unit 20 performs a process for extending a region that is determined to be of the body hair pixels in the body hair map, i.e. a process in which a body hair width in the process target image is extended to have a predetermined width so as to be able to more reliably remove body hair.

Note that, in the above-described body hair detection unit 20, the case in which body hair detection is performed using image data having three RGB principle colors has been described, but the present technology is not limited thereto. It is also possible to perform body hair detection in such a way that, for example, a color space axis that makes separation of body hair from skin is obtained from an RGB color distribution, and the colors of the body hair and the skin are defined using the color space axis.

2-3. Configuration of the Body Hair Removal Unit

The body hair removal unit 30 removes body hair detected by the body hair detection unit 20 from a process target image in the state in which a texture structure is retained.

Figure 6:
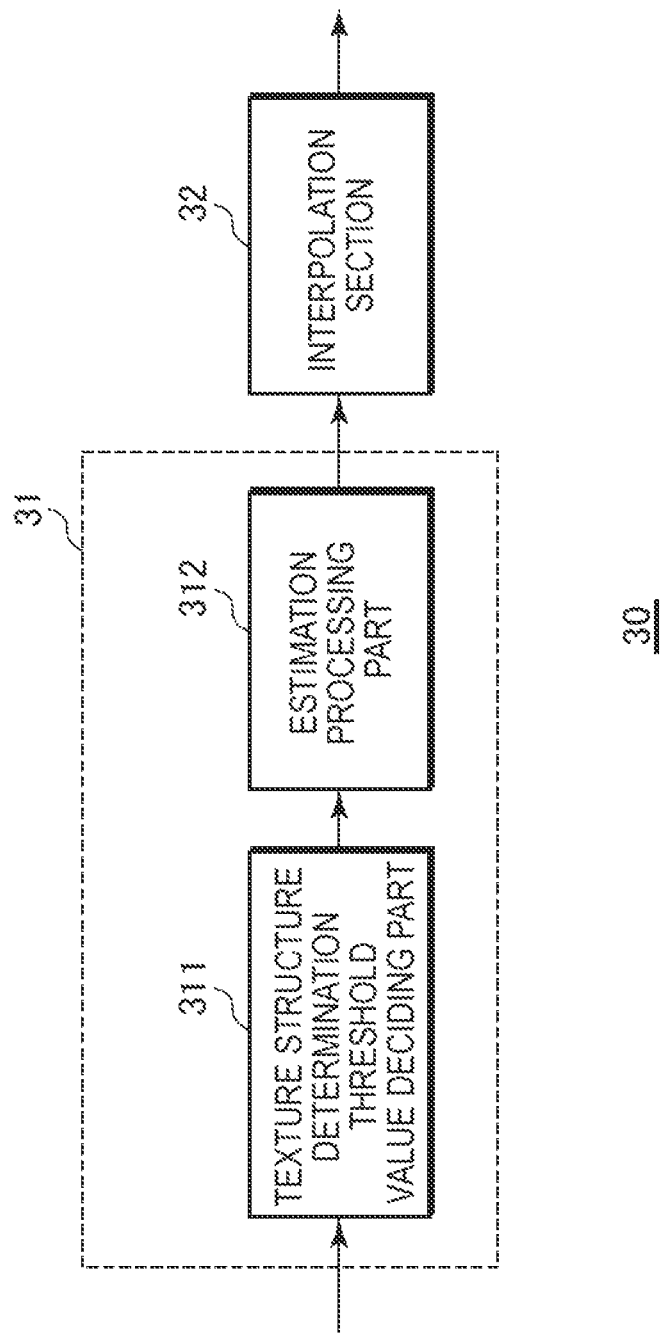
FIG. 6 is a diagram showing a configuration of a body hair removal unit.

FIG. 6 shows a configuration of the body hair removal unit. The body hair removal unit 30 is configured to include a texture structure estimation section 31 and an interpolation section 32. In addition, the texture structure estimation section 31 is configured to include a texture structure determination threshold value deciding part 311 and an estimation processing part 312.

Figure 7:
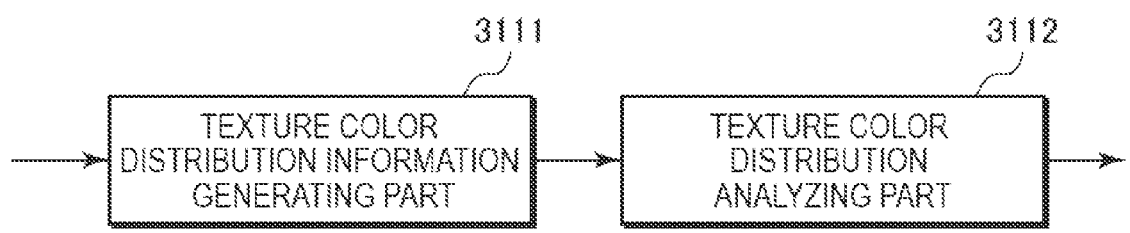
FIG. 7 is a diagram showing a configuration of a texture structure determination threshold value deciding part.

The texture structure determination threshold value deciding part 311 of the texture structure estimation section 31 decides a texture structure determination threshold value (second threshold value) for assorting pixels into skin ridge pixels and skin groove pixels in the region other than the body hair region. FIG. 7 shows a configuration of the texture structure determination threshold value deciding part 311. The texture structure determination threshold value deciding part 311 is configured to include a texture color distribution information generating part 3111 and a texture color distribution analyzing part 3112.

The texture color distribution information generating part 3111 creates texture color distribution information from pixels in the region other than the body hair region, for example, a histogram for luminance from skin pixels that are pixels in the region other than the body hair region based on the process target image and the body hair map.

The texture color distribution analyzing part 3112 estimates distribution of skin ridge pixels and distribution of skin groove pixels based on the texture color distribution information generated in the texture color distribution information generating part 3111, and then decides a texture structure determination threshold value for distinguishing the skin ridge pixels from the skin groove pixels from the estimation result. The texture color distribution analyzing part 3112 outputs the texture structure determination threshold value to the estimation processing part 312.

The estimation processing part 312 determines whether or not a pixel in the process target image outside of the body hair region is a skin ridge pixel or a skin groove pixel using the texture structure determination threshold value decided by the texture structure determination threshold value deciding part 311. Further, the estimation processing part generates estimation information for deciding whether a pixel of interest within the body hair region belongs to either part of the skin ridge pixels or the skin groove pixels, using the determination result. The estimation processing part 312 outputs the estimation information to the interpolation section 32.

The interpolation section 32 switches pixels to be used for pixel interpolation of the body hair region based on the estimation information supplied from the texture structure estimation section 31 so as to perform interpolation while considering the texture structure and then so that the texture structure is retained even in an image region in which body hair is removed.

2-4. Operation of the Body Hair Removal Unit

Figure 8:
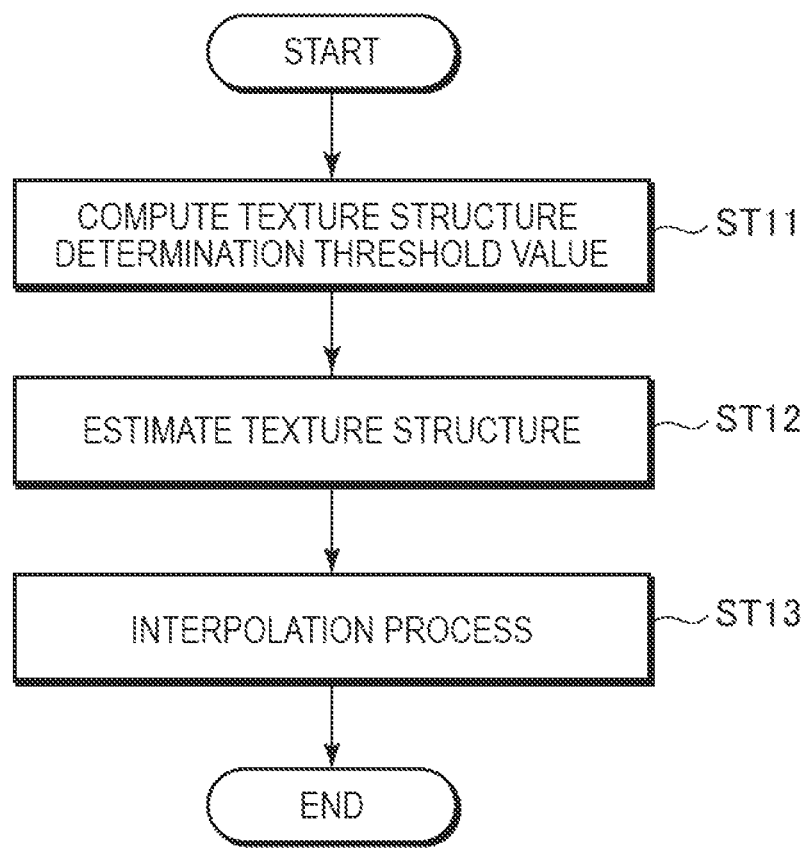
FIG. 8 is a flowchart showing an operation of the body hair removal unit.

FIG. 8 is a flowchart showing an operation of the body hair removal unit. In Step ST11, the body hair removal unit 30 computes a texture structure determination threshold value. The texture structure estimation section 31 of the body hair removal unit 30 creates texture color distribution information, for example, a histogram of luminance for pixels in the region other than the body hair region based on the process target image and the body hair map. Next, the texture structure estimation section 31 estimates distribution of the skin ridge pixels and the skin groove pixels from the texture color distribution information, and based on the estimation result, decides the texture structure determination threshold value (second threshold value) for assorting pixels in the region other than the body hair region into the skin ridge pixels and the skin groove pixels, and process proceeds to Step ST12.

Figure 9:
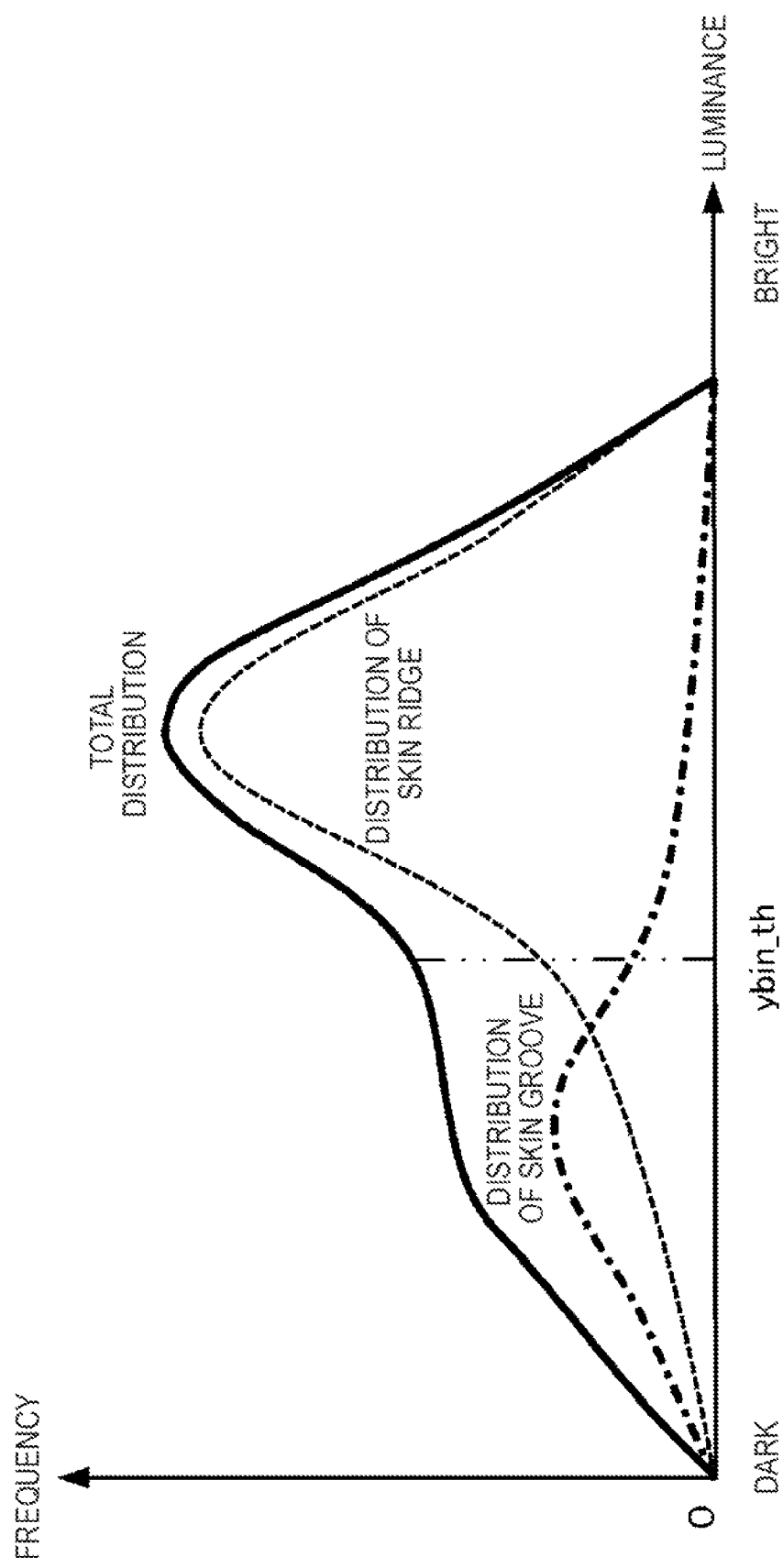
FIG. 9 is a diagram exemplifying a histogram of luminance of pixels in a region other than a body hair region.

Herein, the skin ridge pixels are pixels brighter than the skin groove pixels. Thus, the histogram of luminance of pixels in the region other than the body hair region ideally shows distribution (indicated by the solid line) obtained by synthesizing distribution of the light skin ridge pixels (indicated by the dotted line) and distribution of the dark skin groove pixels (indicated by the dashed line), for example, as shown in FIG. 9. The texture structure estimation section 31 estimates the distribution of the skin ridge pixels and the distribution of the skin groove pixels from the texture color distribution information indicating distribution after the synthesis. For example, by performing GMM (Gaussian Mixture Model) approximation on one-dimensional distribution after the synthesis as shown in, for example, FIG. 9, the distribution is classified into two classes (a class indicating the skin ridge and a class indicating the skin groove), and the boundary of the classes is set to a texture structure determination threshold value ybin_th. Alternatively, the peak position of the distribution of the skin ridge pixels and the peak position of the distribution of the skin groove pixels are estimated from the distribution after the synthesis, and the intermediate position between the peak position of the skin ridge pixels and the peak position of the skin groove pixels may be set to the texture structure determination threshold value ybin_th. Alternatively, a position separated in the direction from one peak position to the other peak position by a predetermined amount may be set to the texture structure determination threshold value ybin_th.

In Step ST12, the body hair removal unit 30 performs estimation of a texture structure. The texture structure estimation section 31 of the body hair removal unit 30 compares the texture structure determination threshold value to each pixel value of pixels in the region other than the body hair region, and then determines a pixel of which the pixel value is greater than the texture structure determination threshold value to be a skin ridge pixel, and determines a pixel of which the pixel value is lower than or equal to the texture structure determination threshold value to be a skin groove pixel. Further, the texture structure estimation section 31 generates estimation information for determining whether a pixel of interest in the body hair region belongs to either part of the skin ridge pixels or the skin groove pixels, using the determination result of the pixels in the region other than the body hair region.

Figure 10:
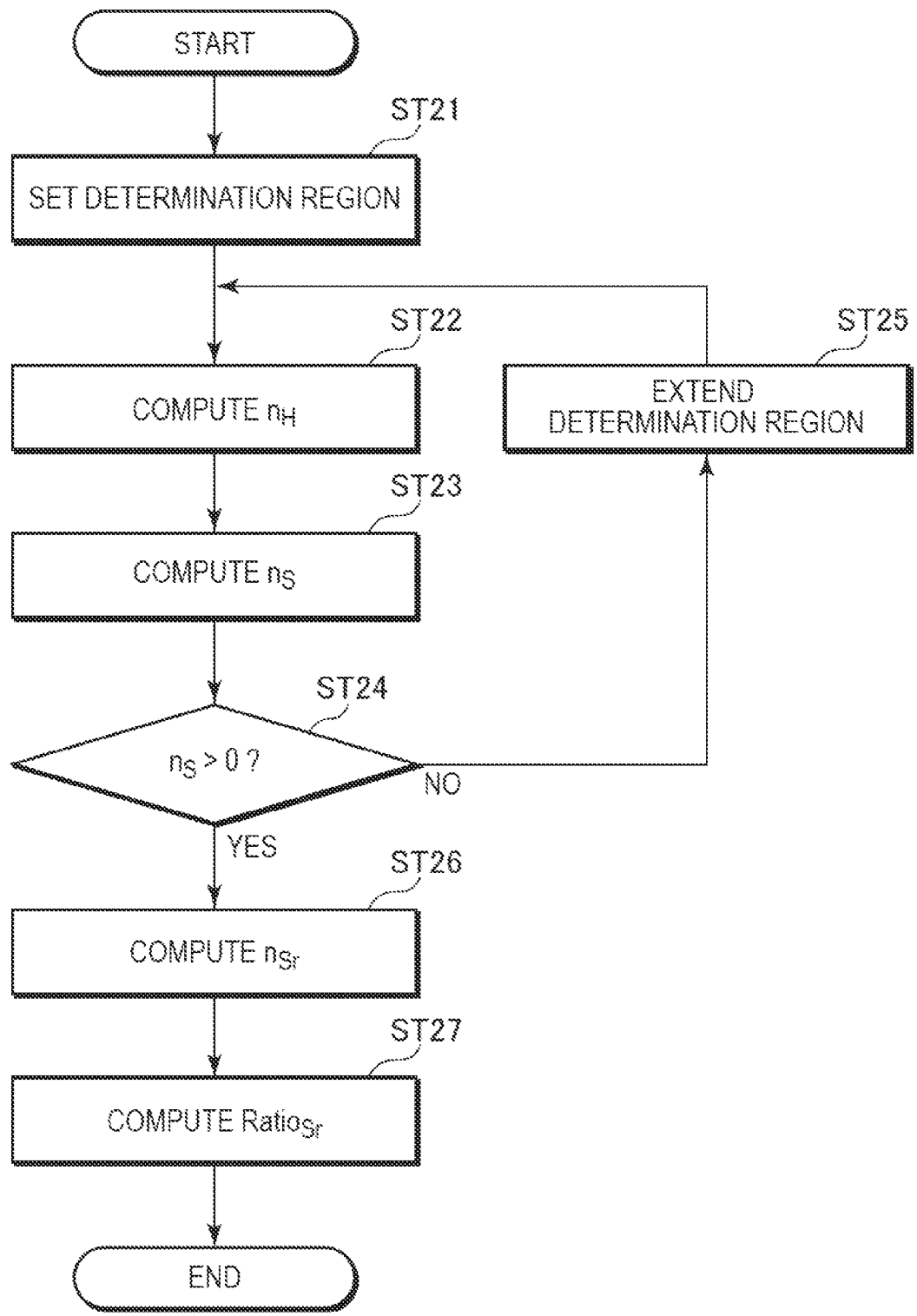
FIG. 10 is a flowchart showing a generation operation of skin ridge/skin groove determination information.

FIG. 10 is a flowchart showing a generation operation of the determination information. In Step ST21, the texture structure estimation section 31 sets a determination region with reference to a pixel (pixel of interest) within the body hair region to be estimated. In addition, the process of the texture structure estimation section 31 proceeds to Step ST22 after setting the determination region to have an initial size.

In Step ST22, the texture structure estimation section 31 computes the number of body hair pixels $n_H$ in the determination region, and then the process proceeds to Step ST23.

In Step ST23, the texture structure estimation section 31 computes the number of skin pixels $n_S$ in the determination region, and then the process proceeds to Step ST24. When the initial size of the determination region is 3×3 pixels, for example, the region excluding the pixel of interest has 8 pixels, and thus the number of pixels $n_S$ can be computed based on Formula (6).

$$n_S = 8 - n_H \quad (6)$$

In Step ST24, the texture structure estimation section 31 determines whether the number of pixels $n_S$ is greater than "0." When the number of pixels $n_S$ is "0," the process of the texture structure estimation section 31 proceeds to Step ST25, and when the number of pixels $n_S$ is greater than "0," the process proceeds to Step ST26.

In Step ST25, the texture structure estimation section 31 extends the determination region since skin pixels are not included in the determination region. The texture structure estimation section 31 extends the determination region with reference to the pixel of interest, and then the process returns to Step ST22. For example, the texture structure estimation section 31 extends the determination region to the upper, lower, right, and left sides by one pixel with reference to the pixel of interest so as to set the obtained determination region to have a general size.

In Step ST26, the texture structure estimation section 31 computes the number of skin ridge pixels $n_{Sr}$. The texture structure estimation section 31 computes the number of skin ridge pixels $n_{Sr}$ in the determination region, and then the process proceeds to Step ST27.

In Step ST27, the texture structure estimation section 31 computes a skin ridge ratio $Ratio_{Sr}$. The texture structure estimation section 31 performs calculation of Formula (7), and sets the skin ridge ratio $Ratio_{Sr}$ indicating the ratio of the skin ridge pixels in the determination region to be estimation information.

[Math. 3]

$$Ratio_{Sr} = \frac{n_{Sr}}{n_S} \quad (7)$$

If the generation of the estimation information is performed in this manner, when the number of pixels $n_S$ at the time when the determination region is set to the initial size (3×3 pixels) is greater than "0" as shown in, for example, FIG.

Figure 11:
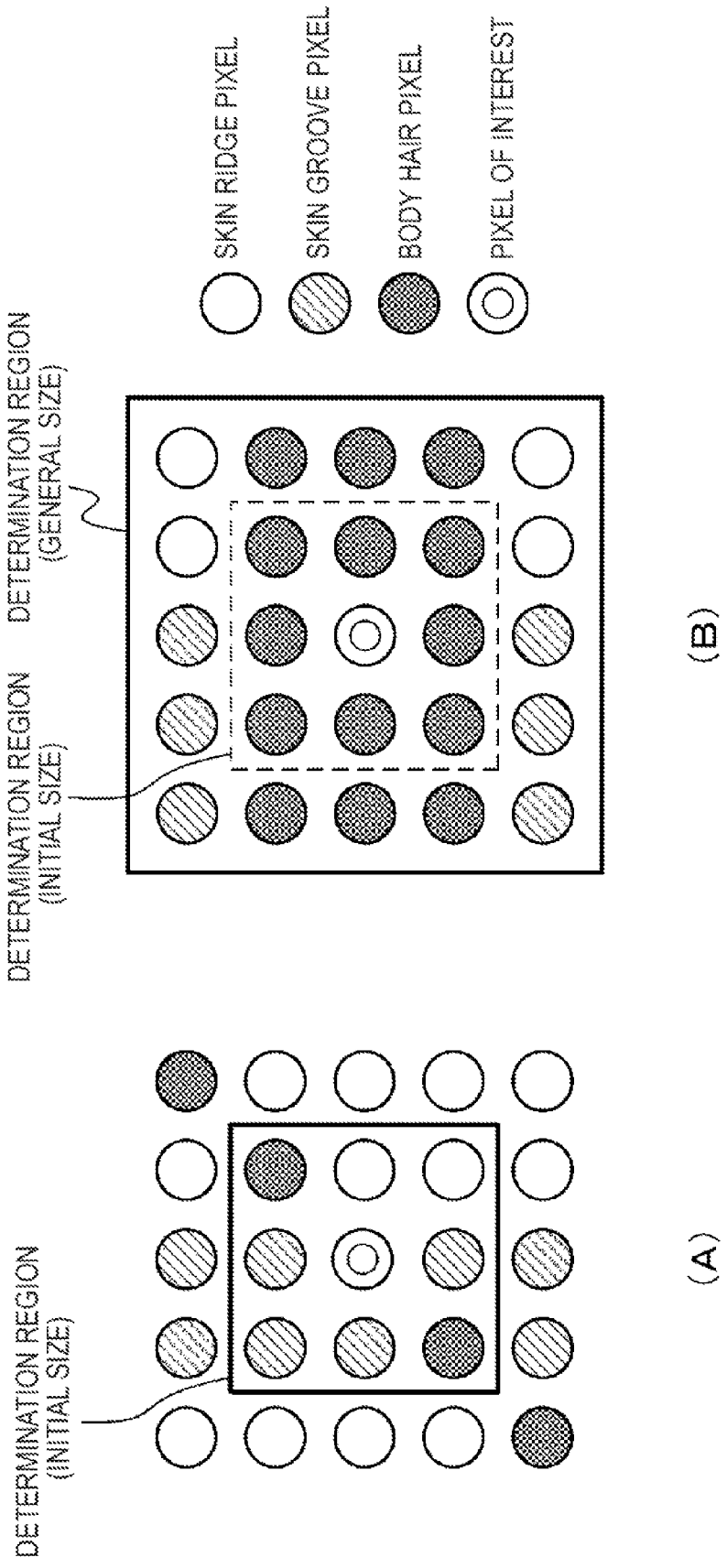
FIG. 11 is a diagram for describing generation of estimation information.

11(A), the estimation information is generated based on the pixels in the determination region of the initial size. In addition, when the number of pixels $n_S$ at the time when the determination region is set to the initial size is "0" as shown in FIG. 11(B), the estimation information is generated based on the pixels in the determination region of the general size (5×5 pixels).

In this manner, the texture structure estimation section 31 generates the estimation information, and then the process proceeds to Step ST13 of FIG. 8.

In Step ST13, the interpolation section 32 performs an interpolation process while considering the texture structure. The interpolation section 32 performs the interpolation process using the skin ridge pixels and the skin groove pixels based on the generated estimation information.

Figure 12:
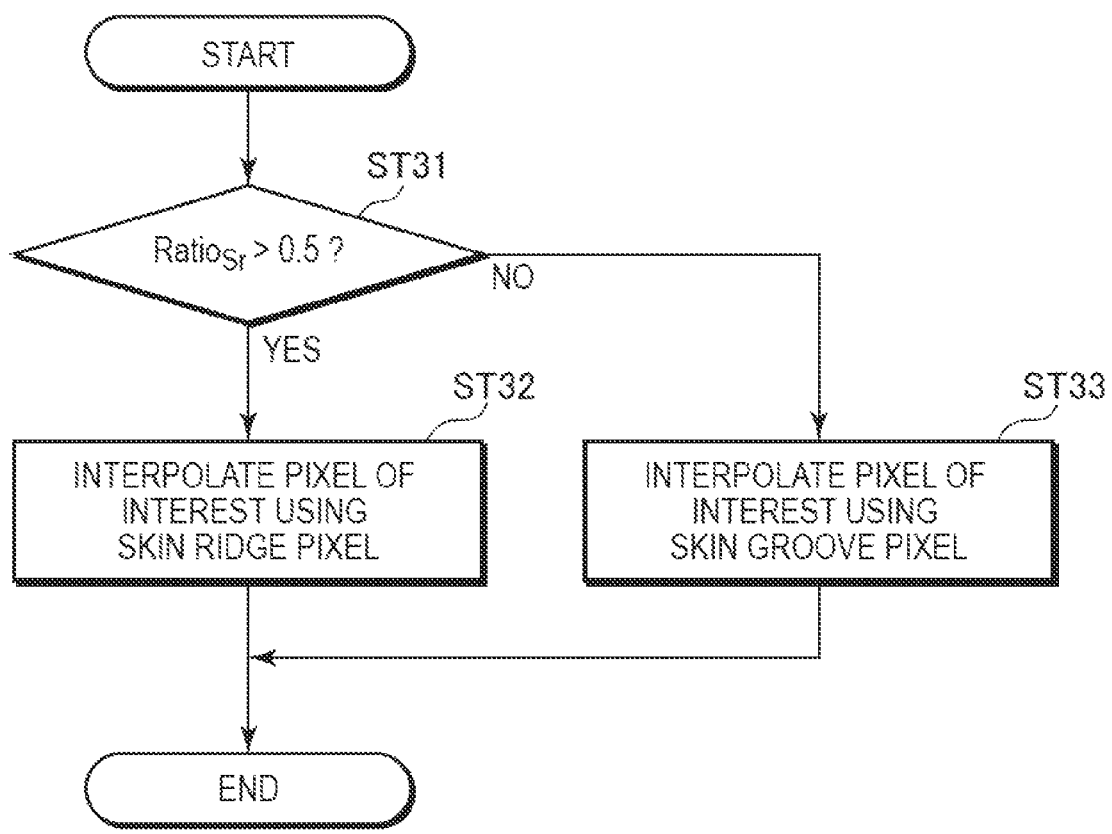
FIG. 12 is a flowchart showing an interpolation process.

FIG. 12 is a flowchart showing the interpolating process. In Step ST31, the interpolation section 32 determines whether or not the skin ridge ratio $Ratio_{Sr}$ that is the estimation information is greater than "0.5." When the skin ridge ratio $Ratio_{Sr}$ is greater than "0.5," the process of the interpolation section 32 proceeds to Step ST32. In addition, when the skin ridge ratio $Ratio_{Sr}$ is lower than or equal to "0.5," the process of the interpolation section 32 proceeds to Step ST33.

In Step ST32, the interpolation section 32 interpolates a pixel of interest using a skin ridge pixel. The interpolation section 32 performs an arithmetic operation process using Formula (8) to compute the pixel value of the pixel of interest based on the pixel values of the skin ridge pixel in a peripheral region set with reference to the pixel of interest. Note that, in Formula (8), "n" indicates the ID of the skin ridge pixel in the peripheral region. In addition, "I'" is a pixel value after interpolation, "$I_{Sr}(n)$" is the pixel value of the skin ridge pixel, and "$W_{Sr}(n)$" is the weight of the skin ridge pixel. Note that the weight "$W_{Sr}(n)$" of the skin ridge pixel is set to be a value computed from Formula (9).

[Math. 4]

$$I'(x, y) = \sum_{n=1}^{n_{Sr}} w_{Sr}(n) \cdot I_{Sr}(n) \quad (Ratio_{Sr} > 0.5) \tag{8}$$

$$w_{Sr}(n) = \frac{1}{n_{Sr}} \tag{9}$$

In Step ST33, the interpolation section 32 interpolates the pixel of interest using a skin groove pixel. The interpolation section 32 performs an arithmetic operation process using Formula (10) to compute the pixel value of the pixel of interest based on the pixel value of the skin groove pixel in a peripheral region set with reference to the pixel of interest. Note that, in Formula (10), "n" indicates the ID of the skin ridge pixel in the peripheral region. In addition, "I'" is a pixel value after interpolation, "$I_{Sv}(n)$" is the pixel value of the skin groove pixel, and "$W_{Sv}(n)$" is the weight of the skin groove pixel. Note that the weight "$W_{Sv}(n)$" of the skin groove pixel is set to be a value computed from Formula (11).

[Math. 4]

$$I'(x, y) = \sum_{n=1}^{n_{Sv}} w_{Sv}(n) \cdot I_{Sv}(n) \quad (Ratio_{Sr} \le 0.5) \tag{10}$$

$$w_{Sv}(n) = \frac{1}{n_{Sv}} \tag{11}$$

Figure 13:
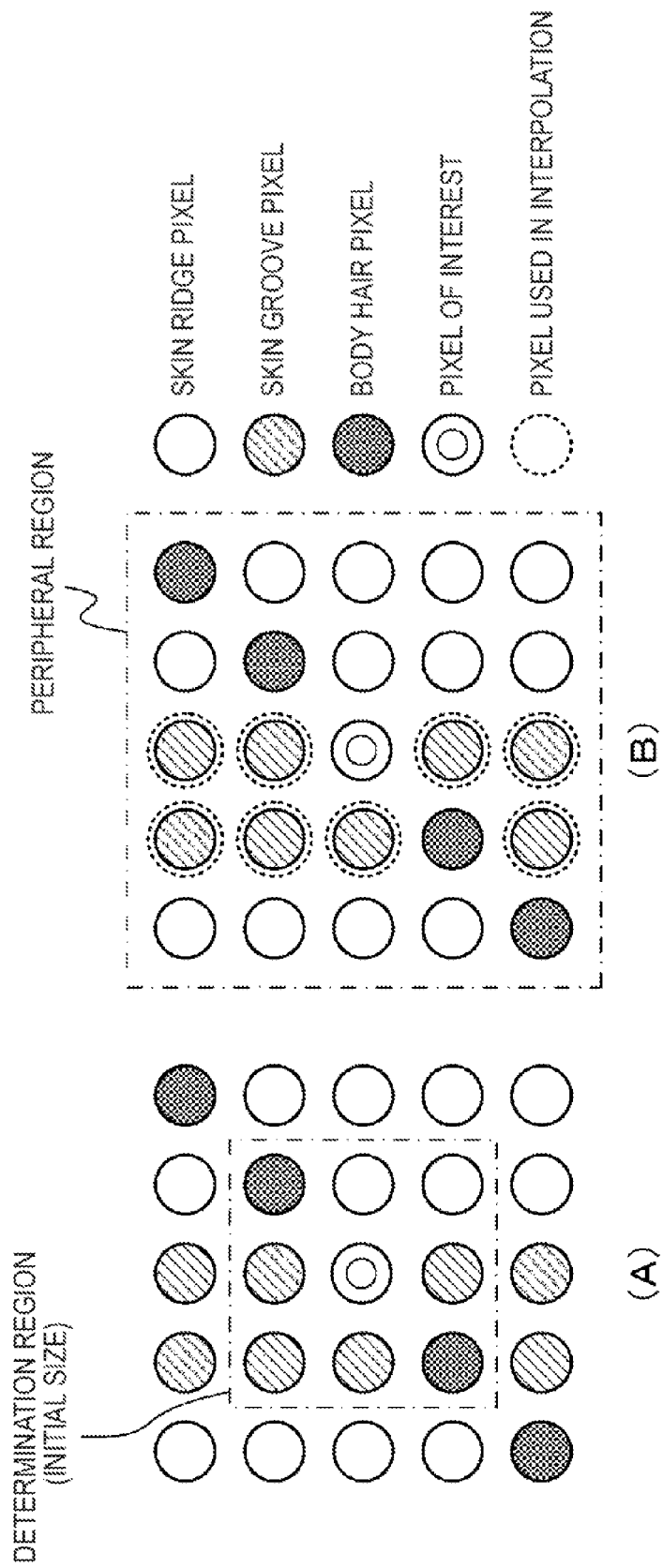
FIG. 13 is a diagram for describing the interpolation process.
Figure 14:
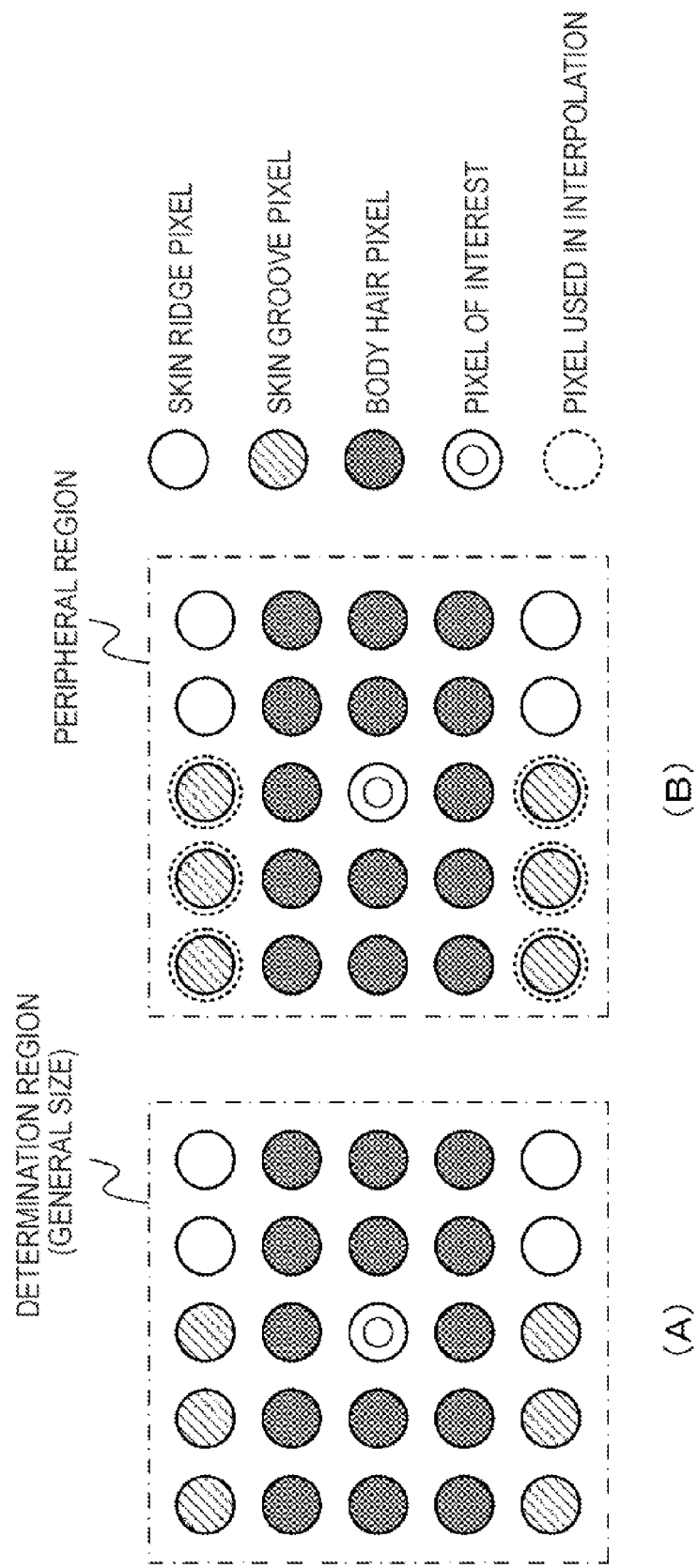
FIG. 14 is a diagram for describing another interpolation process.

If such a process is performed, when the ratio of the skin groove pixels is high in the determination region of the initial size (3×3 pixels) as shown in, for example, FIG. 13(A), interpolation is performed on the pixel of interest using the pixel values of the skin groove pixels in the peripheral region as shown in FIG. 13(B). In addition, when the ratio of the skin groove pixels is high in the determination region of the general size (5×5 pixels) as shown in, for example, FIG. 14(A), interpolation is performed on the pixel of interest using the pixel values of the skin groove pixels in the peripheral region as shown in FIG. 14(B).

3. Second Embodiment

In the first embodiment, the case in which the generation of estimation information and an interpolation process are performed using pixels in a determination region of which the size is decided in advance and in a periphery region has been described. However, when a region size is decided in advance, if, for example, body hair is thick and all pixels in a region are body hair pixels, there is concern that the generation of estimation information and an interpolation process are not able to be performed as described above. Thus, in a second embodiment, a case in which the generation of estimation information and an interpolation process are performed by setting a region size according to a body hair width will be described.

3-1. Configuration and Operation of the Body Hair Detection Unit

In the second embodiment, the body hair detection unit 20 has the same configuration as that in the first embodiment. In other words, the body hair detection unit 20 is configured to include the color conversion coefficient decision section 21, the color conversion section 22, the color distribution information generation section 23, the threshold value decision section 24, the binarization section 25, and the region extension section 26, as shown in FIG. 2.

The color conversion coefficient decision section 21 decides a color conversion coefficient which minimizes an error rate of body hair detection. The color conversion coefficient decision section 21 outputs the decided color conversion coefficient to the color conversion section 22.

The color conversion section 22 performs color conversion on a process target image using the color conversion coefficient decided in the color conversion coefficient decision section 21 so as to generate a color conversion image in which the color of skin and the color of body hair are easily distinguished from each other and then to output the color conversion image to the color distribution information generation section 23.

The color distribution information generation section 23 generates color distribution information indicating a distribution state of the colors of the skin and the body hair from the color conversion image. The color distribution information generation section 23 generates, for example, a histogram or a cumulative histogram as color distribution information using pixel values of the color conversion image.

The threshold value decision section 24 decides a body hair determination threshold value (first threshold value) to assort the color conversion image into pixels of the color of the skin and pixels of the color of the body hair based on the color distribution information generated in the color distribution information generation section 23. The threshold value decision section 24 outputs the decided body hair determination threshold value to the binarization section 25.

The binarization section 25 performs a binarization process on the color conversion image using the body hair determination threshold value supplied from the threshold value decision section 24. The binarization section 25 compares each pixel value of the color conversion image to the body hair determination threshold value and then generates a body hair map which indicates whether each pixel is either a skin pixel or a body hair pixel.

The region extension section 26 performs a region extension process on the body hair map generated in the binarization section 25. The region extension section 26 performs a process of extending a region that is determined to be of body hair pixels, in other words, a process in which a body hair width in the process target image is extended to have, for example, a predetermined width so that the body hair removal unit 30 can more reliably remove body hair from the process target image.

The body hair detection unit 20 configured as above performs the process shown in FIG. 3 to determine a body hair pixel region. In other words, the body hair detection unit 20 decides a color conversion coefficient in Step ST1, and then the process proceeds to Step ST2. The body hair detection unit 20 performs color conversion in Step ST2, and then the process proceeds to Step ST3. The body hair detection unit 20 performs generation of color distribution information in Step ST3, and then the process proceeds to Step ST4. The body hair detection unit 20 decides a body hair determination threshold value in Step ST4, and then the process proceeds to Step ST5. The body hair detection unit 20 performs a binarization process in Step ST5, and then the process proceeds to Step ST6. The body hair detection unit 20 performs extension of a body hair region in Step ST6. In this manner, the body hair detection unit 20 detects a body hair region corresponding to body hair from a process target image.

3-2. Configuration of the Body Hair Removal Unit

The body hair removal unit 30 according to the second embodiment removes a body hair image from a process target image using a body hair map obtained by the body hair detection unit 20. In addition, the body hair removal unit 30 adjusts a region size according to a body hair width in the process target image, and then performs an interpolation process while considering generation of estimation information and a structure of skin texture.

Figure 15:
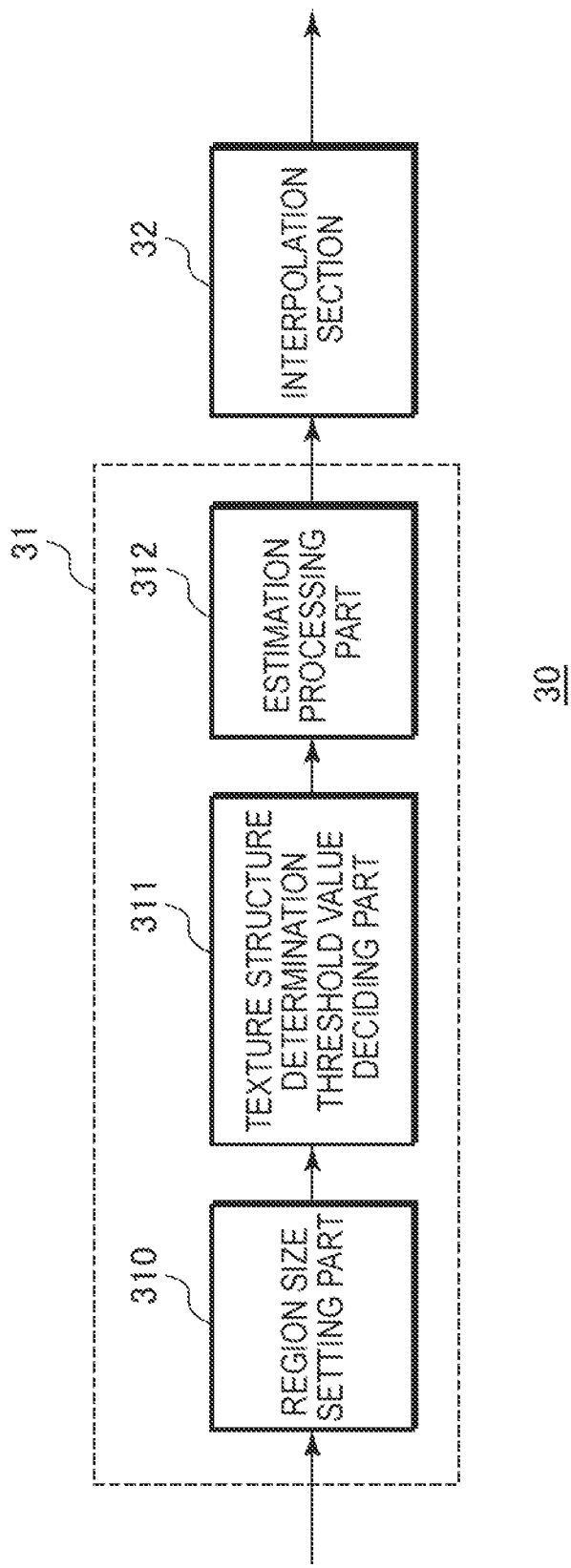
FIG. 15 is a diagram showing another configuration of the body hair removal unit.

FIG. 15 shows another configuration of the body hair removal unit according to the second embodiment. The body hair removal unit 30 is configured to include the texture structure estimation section 31, and the interpolation section 32. In addition, the texture structure estimation section 31 is configured to include a region size setting part 310, the texture structure determination threshold value deciding part 311, and the estimation processing part 312.

Figure 16:
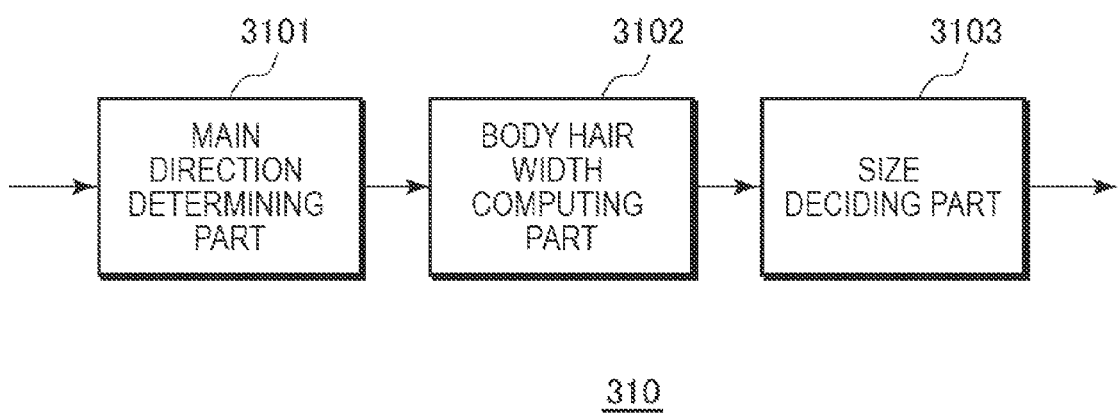
FIG. 16 is a diagram showing a configuration of a region size setting part.

FIG. 16 shows a configuration of the region size setting part. The region size setting part 310 is configured to include a main direction determining part 3101, a body hair width computing part 3102, and a size deciding part 3103.

The main direction determining part 3101 analyzes an edge direction in a body hair map generated in the body hair detection unit 20 and a process target image to determine the edge direction indicated in the analysis result to be the main direction of body hair. The main direction determining part 3101 outputs the determination result of the main direction of the body hair to the body hair width computing part 3102.

The body hair width computing part 3102 sets a direction orthogonal to the main direction of the body hair determined by the main direction determining part 3101 to be a body hair width. The body hair width computing part 3102 outputs information indicating the computed body hair width to the size deciding part 3103.

The size deciding part 3103 decides the region sizes of a determination region for generating estimation information and of a peripheral region in which pixel values are used in pixel interpolation according to the body hair width computed by the body hair width computing part 3102.

The texture structure determination threshold value deciding part 311 of FIG. 15 has the same configuration and performs the same operation as that in the first embodiment, and then decides a texture structure determination threshold value (second threshold value) for assorting pixels in the region other than the body hair region into skin ridge pixels and skin groove pixels.

The estimation processing part 312 determines whether a pixel of the process target image outside of the body hair region is either a skin ridge pixel or a skin groove pixel using the texture structure determination threshold value decided by the texture structure determination threshold value deciding part 311. Further, the estimation processing part generates estimation information for determining whether a pixel of interest in the body hair region belongs to either part of the skin ridge pixels or the skin groove pixels using the determination result of the skin ridge pixels and the skin groove pixels in the determination region of the region size decided in the size deciding part 3103. The estimation processing part 312 outputs the estimation information to the interpolation section 32.

The interpolation section 32 performs interpolation from inside the peripheral region of the region size decided in the side deciding part 3103 selectively using pixels to be used in pixel interpolation of the body hair region, based on the estimation information supplied from the texture structure estimation section 31. In this manner, by performing interpolation from inside the peripheral region selectively using the pixels to be used in pixel interpolation in the body hair region based on the estimation information, a texture structure may be retained even in an image region in which body hair is removed.

3-3. Operation of the Body Hair Removal Unit

Figure 17:
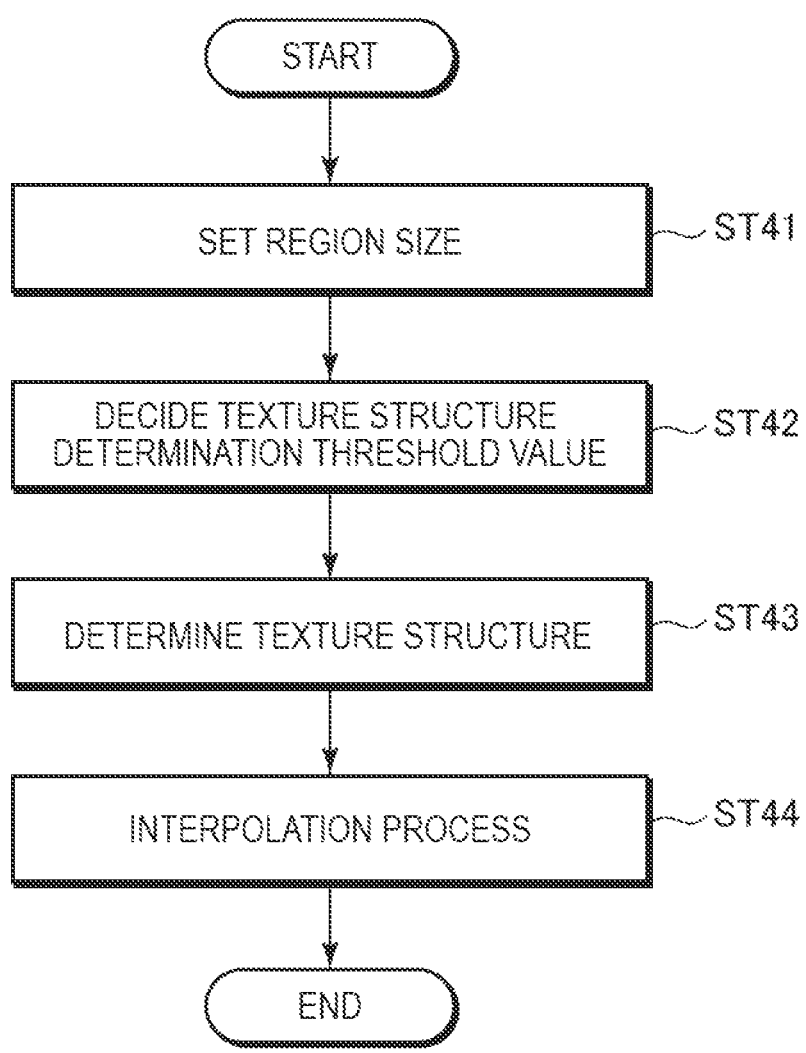
FIG. 17 is a flowchart showing another operation of the body hair removal unit.

FIG. 17 is a flowchart showing another operation of the body hair removal unit. In Step ST41, the body hair removal unit 30 performs setting of a region size. The texture structure estimation section 31 of the body hair removal unit 30 detects the width of body hair and then sets a region size according to the detection result.

Figure 18:
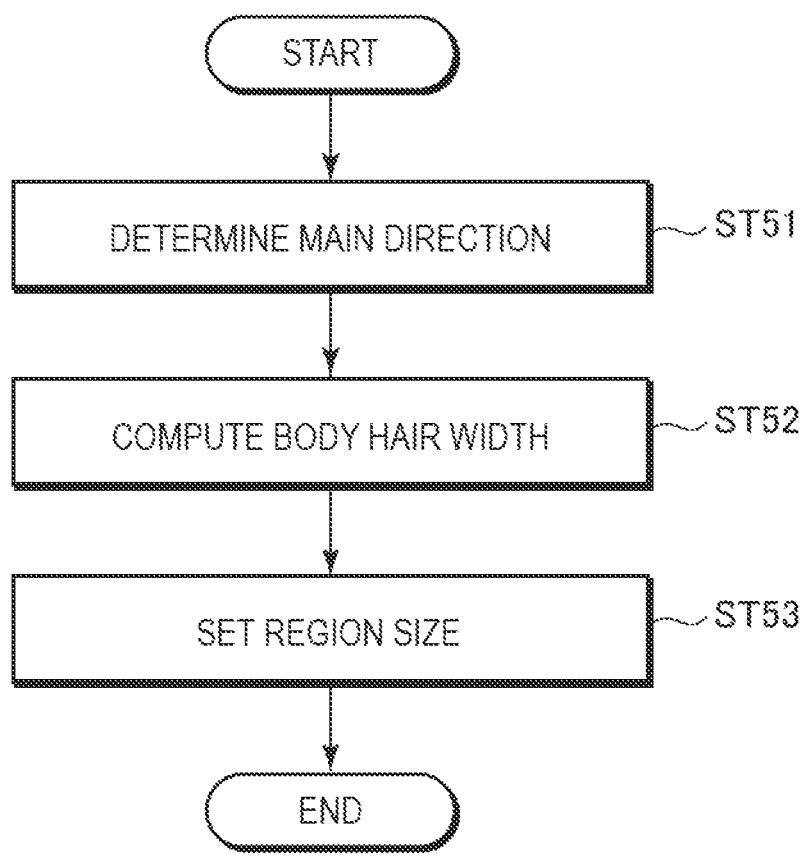
FIG. 18 is a flowchart showing a setting operation of a region size.

FIG. 18 is a flowchart showing a setting operation of the region size. In Step ST51, the texture structure estimation section 31 performs determination of a main direction. The texture structure estimation section 31 analyzes an edge direction of a body hair image, and determines the edge direction shown in the analysis result to be the main direction of body hair, and the process proceeds to Step ST52.

In the analysis of the edge direction, by providing a plurality of filters for detecting the edges of different directions, for example, a filter for detecting the edge in the horizontal direction, a filter for detecting the edge in the vertical direction, a filter for detecting the edge of the oblique direction, and the like, the direction of an edge detected by a filter of which the filter output is the highest is determined to be the main direction. In addition, in the analysis of the edge direction, the determination may be performed using other methods in the related art.

In Step ST52, the texture structure estimation section 31 performs computation of a body hair width. The texture structure estimation section 31 sets a direction orthogonal to the main direction of the body hair determined in Step ST51 to be a body hair width of the process target image.

Figure 19:
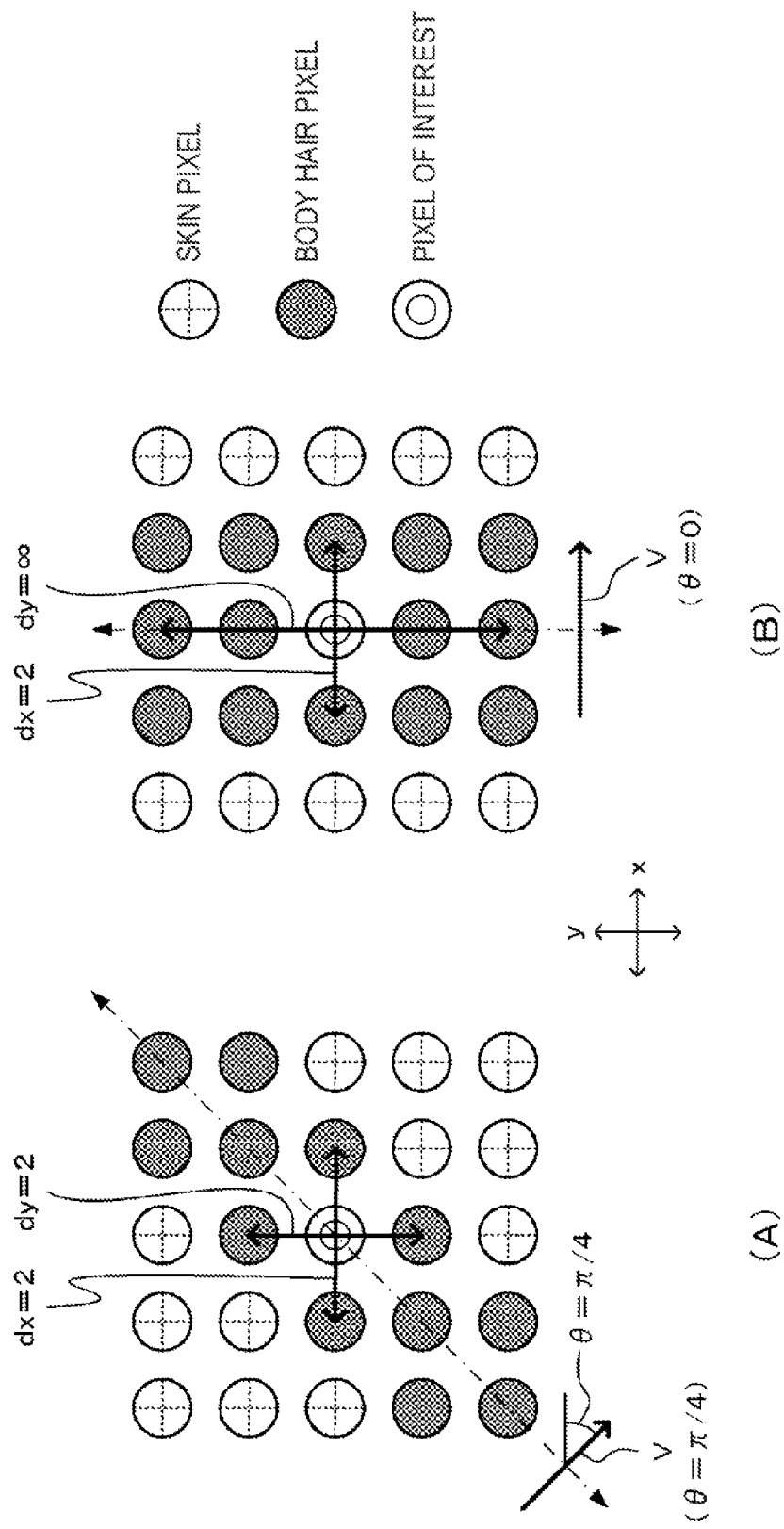
FIG. 19 is a diagram for describing computation of a body hair width.

FIG. 19 is a diagram for describing computation of a body hair width. FIG. 19(A) exemplifies a case in which the main direction (indicated by the dashed line) is inclined at degrees with respect to the horizontal direction (x direction), and FIG. 19(B) exemplifies a case in which the main direction (indicated by the dashed line) is inclined at 90 degrees with respect to the horizontal direction. Herein, a vector V (width direction vector) of the direction orthogonal to the main direction (=corresponding to the radial direction of the body hair) can be computed based on Formula (12) or Formula (13).

[Math. 6]

$$|v| = d_x \cdot |\cos \theta| \quad (12)$$

$$|v| = d_y \cdot |\sin \theta| \quad (13)$$

Note that "$d_x$" indicates the number of body hair pixels continuous in the horizontal direction beginning from a pixel of interest. "$d_y$" indicates the number of body hair pixels continuous in the vertical direction (y direction) beginning from the pixel of interest.

In the case of FIG. 19(A), for example, "$d_x=2$ and $d_y=2$" are set. "θ" is an angle indicating the direction difference from the horizontal direction and the width direction vector V. A body hair width D is computed based on, for example, Formula (14). Note that "$\alpha_x$" is set to be a value obtained from Formula (15).

[Math. 7]

$$D = \alpha_x \cdot d_x \cdot |\cos\theta| + (1 - \alpha_x) \cdot d_y \cdot |\sin\theta| \quad (14)$$

$$\alpha_x = \frac{d_y}{d_x + d_y} \quad (15)$$

Therefore, in the case of FIG. 19(A), since "$d_x=2$, $d_y=2$, $\alpha_x=0.5$, and $\theta=\pi/4$" are set, "D√2."

In addition, in the case of FIG. 19(B), since the body hair pixels are consecutive in the vertical direction, the body hair width D is computed as "$d_y=\infty$." In other words, since "$d_x=2$, $d_y=\infty$, $\alpha_x\approx1$, and $\theta=0$" are set, "D=2."

In this manner, the texture structure estimation section 31 computes a body hair region size of the direction orthogonal to the body hair main direction as the body hair width, and then the process proceeds to Step ST53. In addition, the body hair region size can be determined based on the pixel of interest in a direction determination region set with reference to the pixel of interest, and the number of consecutive body hair pixels.

In Step ST53, the texture structure estimation section 31 sets region sizes. The texture structure estimation section 31 decides the region size of the determination region for generating the estimation information and of the peripheral region in which pixel values are used in pixel interpolation according to the body hair width computed in Step ST52.

Figure 20:
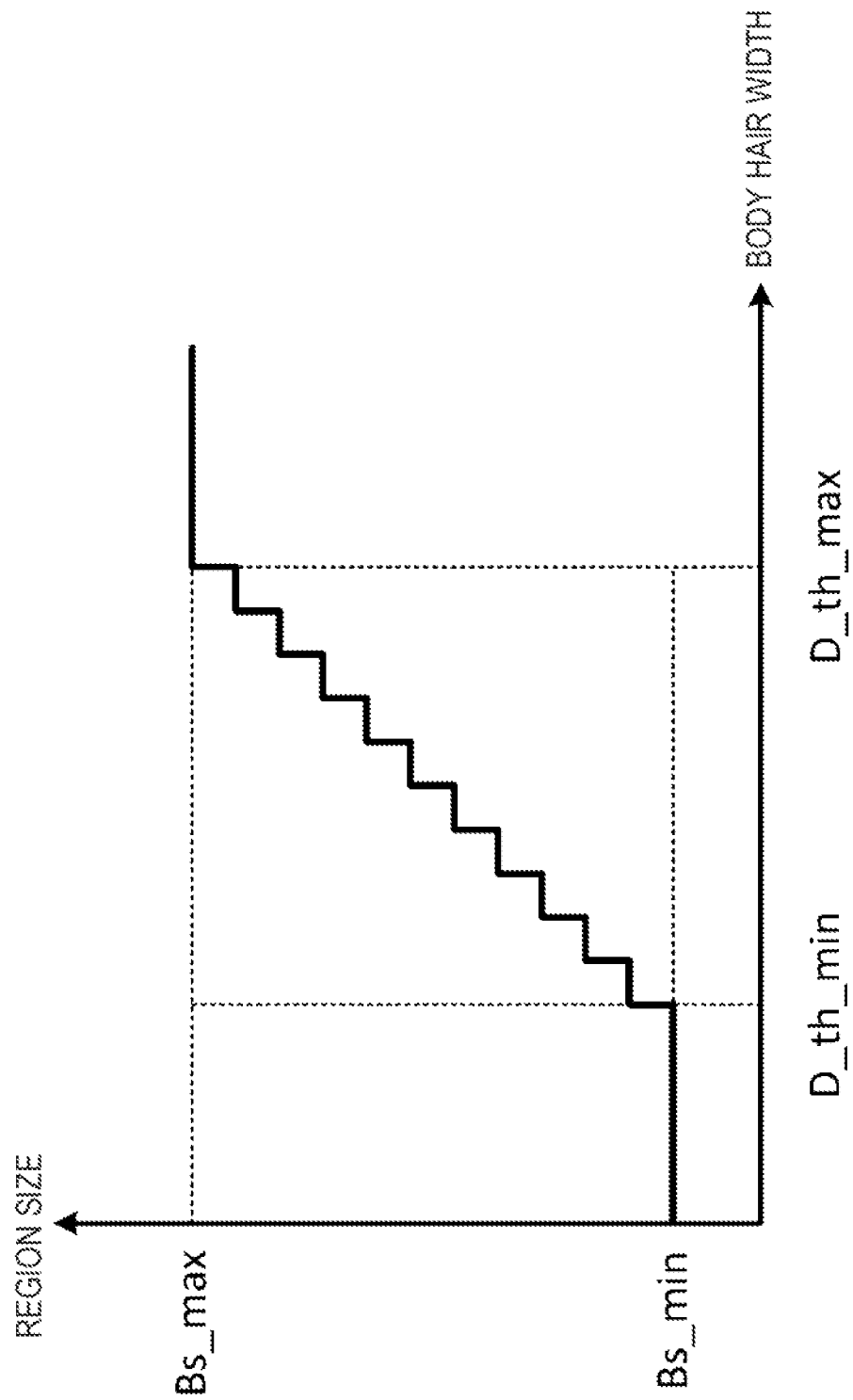
FIG. 20 is a diagram showing the relationship between a body hair width and a region size.

FIG. 20 shows the relationship between the body hair width and the region sizes. The texture structure estimation section 31 sets an upper limit threshold value D_th_max and a lower limit threshold value D_th_min for the body hair width D in advance. In addition, the texture structure estimation section 31 sets a maximum region size BS_max as the region size in the upper limit threshold value D_th_max, and a minimum region size BS_min as the region size in the lower limit threshold value D_th_min.

When the body hair width D is within the range of the upper limit threshold value D_th_max and the lower limit threshold value D_th_min, the texture structure estimation section 31 widens the region size as the body hair width D is widened. The region size is set to be, for example, a size of an odd number of pixels so that the pixel of interest is located at the center position of the region. Thus, the region is extended in units of an even number of pixels. Note that the texture structure estimation section 31 sets the size to the maximum region size BS_max when the body hair width D is equal to or greater than the upper limit threshold value D_th_max, and sets the size to the minimum region size BS_min when the body hair width D is lower than or equal to the lower limit threshold value D_th_min.

In this manner, the texture structure estimation section 31 sets the region size, and then the process proceeds to Step ST42 of FIG. 17.

In Step ST42, the body hair removal unit 30 decides a texture structure determination threshold value. The texture structure estimation section 31 of the body hair removal unit 30 performs the same process as Step ST11 described above. In other words, the texture structure estimation section 31 creates texture color distribution information for pixels in regions other than the body hair regions based on the process target image and the body hair map. Next, the texture structure estimation section 31 estimates distribution of the skin ridge pixels and distribution of the skin groove pixels in addition to them from the texture color distribution information, decides the texture structure determination threshold value (second threshold value) for distinguishing pixels in the regions other than the body hair regions into the skin ridge pixels and the skin groove pixels based on the estimation result, and then the process proceeds to Step ST43.

In Step ST43, the body hair removal unit 30 estimates a texture structure. The texture structure estimation section 31 of the body hair removal unit 30 compares pixel values of the pixels in the regions other than the body hair regions and the texture structure determination threshold value decided in Step ST42, and then determines a pixel of which the pixel value is greater than the texture structure determination threshold value to be a skin ridge pixel, and determines a pixel of which the pixel value is lower than or equal to the texture structure determination threshold value to be a skin groove pixel. Furthermore, the texture structure estimation section 31 generates estimation information for determining whether a pixel of interest within the body hair region belongs to either part of the skin ridge pixels or the skin groove pixels, using the determination result of the pixels in the regions other than the body hair regions. Herein, when the region size set in Step ST53 is bs(D)×bs(D) pixels, the number of pixels other than the pixel of interest within the region is set to "bs(D)×bs(D)−1." In addition, if the number of body hair pixels within this region is set to "$n_H(D)$," and the number of skin pixels is set to "$n_S(D)$," the relationship of Formula (16) is set.

$$n_S(D) = bs(D) \times bs(D) - 1 - n_H(D) \quad (16)$$

Among the number of skin pixels "$n_S(D)$," if the number of skin ridge pixels in the skin pixels is set to "$nS_r(D)$," and the number of skin groove pixels is set to "$nS_r(D)$," a skin ridge ratio $Ratio_{Sr}(D)$ is computed based on Formula (17).

[Math. 8]

$$Ratio_{Sr}(D) = \frac{n_{Sr}(D)}{n_S(D)} \quad (17)$$

In this manner, the texture structure estimation section 31 computes the skin ridge ratio $Ratio_{Sr}(D)$ with respect to the region, and the process proceeds to Step ST44 having the computed skin ridge ratio $Ratio_{Sr}(D)$ as estimation information.

In Step ST44, the interpolation section 32 performs an interpolation process. The interpolation process 32 includes performing interpolation according to a distance from the pixel of interest. Specifically, a pixel to be used in interpolation is switched based on the estimation information.

In the same manner as in the first embodiment, the interpolation section 32 computes the pixel value of the pixel of interest based on the pixel values of the skin ridge pixels within the peripheral region which is set with reference to the pixel of interest when the skin ridge ratio $Ratio_{Sr}(D)$ is greater than "0.5." In addition, the interpolation section 32 computes the pixel value of the pixel of interest based on the pixel values of the skin groove pixels within the peripheral region when the skin ridge ratio $Ratio_{Sr}(D)$ is lower than or equal to "0.5."

When the interpolation of the pixel of interest is performed based on the skin ridge pixels within the peripheral region, the interpolation section 32 performs an arithmetic operation process of Formula (18) to compute the pixel value of the pixel of interest from the pixel values of the skin ridge pixels. Note that, in Formula (18), "n" indicates the ID of a skin ridge pixel within the peripheral region. In addition, "I'" is a pixel value after interpolation, "$I_{Sr}$" is the pixel value of a skin ridge pixel, and "$W_{Sr}(n, D)$" is the weight of a skin ridge pixel.

[Math. 9]

$$I'(x, y) = \sum_{n=1}^{n_{Sr}(D)} w_{Sr}(n, D) \cdot I_{Sr}(n) \quad (Ratio_{Sr}(D) > 0.5) \quad (18)$$

The weight of a skin ridge pixel "$W_{Sr}(n, D)$" is computed using Formula (19).

[Math. 10]

$$w_{Sr}(n, D) \exp\left(-\frac{d_{Sr}(n)}{D}\right) \bigg/ \sum_{n=1}^{n_{Sr}(D)} \exp\left(-\frac{d_{Sr}(n)}{D}\right) \quad (19)$$

In addition, in Formula (19), "$d_{Sr}(n)$" is computed using Formula (20). Note that $(x_{Sr}(n), y_{Sr}(n))$ indicates the position of a skin ridge pixel in the peripheral region, and $(x_p, y_p)$ indicates the position of the pixel of interest.

[Math. 11]

$$d_{Sr}(n) = \sqrt{(x_{Sr}(n)-x_p)^2 + (y_{Sr}(n)-y_p)^2} \quad (20)$$

When interpolation of the pixel of interest is performed based on the skin groove pixels within the peripheral region, the interpolation section 32 performs an arithmetic operation process of Formula (21) to compute the pixel value of the pixel of interest from the pixel values of the skin groove pixels. Note that, in Formula (21), "n" indicates the ID of a skin groove pixel within the peripheral region. In addition, "I'" is a pixel value after interpolation, "$I_{Sv}$" is the pixel value of a skin groove pixel, and "$W_{Sv}(n, D)$" is the weight of a skin groove pixel.

[Math. 12]

$$I'(x, y) = \sum_{n=1}^{n_{Sv}(D)} w_{Sv}(n, D) \cdot I_{Sv}(n) \quad (Ratio_{Sr}(D) \leq 0.5) \quad (21)$$

Note that, in Formula (21), "$W_{Sv}(n, D)$" is computed using Formula (22).

[Math. 13]

$$w_{Sv}(n, D) = \exp\left(-\frac{d_{Sv}(n)}{D}\right) \bigg/ \sum_{n=1}^{n_{Sv}(D)} \exp\left(-\frac{d_{Sv}(n)}{D}\right) \quad (22)$$

In addition, in Formula (22), "$d_{Sv}(n)$" is computed using Formula (23). Note that $(x_{Sv}(n), y_{Sv}(n))$ indicates the position of a skin groove pixel in the peripheral region, and $(x_p, y_p)$ indicates the position of the pixel of interest.

[Math. 14]

$$d_{Sv}(n) = \sqrt{(x_{Sv}(n)-x_p)^2 + (y_{Sv}(n)-y_p)^2} \quad (23)$$

In this manner, if interpolation is performed, the weights of pixels increases in order of proximity to the pixel of interest, and the weights of the pixels decrease in order of remoteness from the pixel of interest. Thus, interpolation is performed according to a distance, and it is thereby possible to perform an interpolation process considering a texture structure more precisely.

4. Other Embodiment

A series of processes described in the specification can be executed using hardware, software, or a combined configuration of both. When a process is executed using software, a program in which a process sequence is recorded is executed by being installed in a memory inside a computer which is incorporated into dedicated hardware. Alternatively, such execution is possible by installing a program in a general-purpose computer which can execute various processes.

For example, a program can be recorded in advance in hard disk or a ROM (Read Only Memory) as a recording medium. Alternatively, such a program can be temporarily or permanently stored (recorded) on a removable recording medium including a flexible disk, a CD-ROM (Compact Disc Read Only Memory), an MO (Magneto Optical) disc, a DVD (Digital Versatile Disc), a magnetic disk, a semiconductor memory card, or the like. Such a removable recording medium can be provided as so-called package software.

In addition, a program may be transferred to a computer in a wired or wireless manner via a network such as the Internet, a LAN (Local Area Network), or the like from a download side, in addition to being installed in a computer from a removable recording medium. The program transferred in that way can be received by a computer, and installed in a recording medium such as a built-in hard disk.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) An image processing device including:
a body hair detection unit that detects a body hair region corresponding to body hair from a process target image that includes skin;
a texture structure estimation unit that estimates a structure of skin texture in the process target image; and
an interpolation unit that interpolates the body hair region detected by the body hair detection unit based on the structure of the skin texture estimated by the texture structure estimation unit.

(2) The image processing device according to (1), wherein the body hair detection unit generates color distribution information of the process target image, decides a first threshold value for distinguishing a body hair pixel from a skin pixel based on the color distribution information, compares each pixel value of the process target image to the first threshold value, and performs detection of the body hair region.

(3) The image processing device according to (2), wherein the body hair detection unit decides a color conversion coefficient that makes color separation of the body hair region from another region easy, performs color conversion of the process target image using the color conversion coefficient, generates the color distribution information from the process target image that has undergone color conversion, and compares each pixel value of the process target image that has undergone the color conversion to the first threshold value.

(4) The image processing device according to (3), wherein the body hair detection unit generates a coefficient that has few errors in detecting the body hair region as the color conversion coefficient.

(5) The image processing device according to (3) or (4), wherein the body hair detection unit decides the color conversion coefficient and the first threshold value on a per-race basis.

(6) The image processing device according to any one of (2) to (5), wherein the body hair detection unit performs binarization on the process target image based on a result obtained by comparing each pixel value of the process target image to the first threshold value to generate body hair distribution information.

(7) The image processing device according to any one of (1) to (6), wherein the body hair detection unit performs region extension on the detected body hair region.

(8) The image processing device according to any one of (1) to (7), wherein the texture structure estimation unit decides a second threshold value for distinguishing a skin ridge pixel from a skin groove pixel, determines whether a skin pixel is a skin ridge pixel or a skin groove pixel in a determination region with a pixel of interest in the body hair region regarded as a reference using the second threshold value, and estimates whether the pixel of interest is a skin ridge pixel or a skin groove pixel according to a proportion of the skin ridge pixel to the skin groove pixel within the determination region.

(9) The image processing device according to (8), wherein the texture structure estimation unit estimates distribution of the skin ridge pixel and distribution of the skin groove pixel from distribution of luminance of a skin pixel in the process target image, and then decides the second threshold value based on the estimation result.

(10) The image processing device according to (8) or (9), wherein the texture structure estimation unit extends a size of the determination region when a skin pixel is not included in the determination region with the pixel of interest in the body hair region regarded as a reference.

(11) The image processing device according to any one of (8) to (10), wherein, when the pixel of interest is estimated to be a skin ridge pixel, the interpolation unit performs interpolation on the pixel of interest using a skin ridge pixel in a peripheral region of the pixel of interest, and when the pixel of interest is estimated to be a skin groove pixel, the interpolation unit performs interpolation on the pixel of interest using a skin groove pixel in the peripheral region.

(12) The image processing device according to (11), wherein the interpolation unit sets a region size of the peripheral region according to a body hair width at a position of the pixel of interest.

(13) The image processing device according to (12), wherein the interpolation unit determines a body hair main direction at the position of the pixel of interest, and then sets a size of a body hair region in a direction orthogonal to the body hair main direction to be the body hair width.

(14) The image processing device according to (13), wherein the interpolation unit determines the size of the body hair region based on a number of body hair pixels consecutive with the pixel of interest within a direction determination region with the pixel of interest regarded as a reference.

In the image processing device, the image processing method, and the program of the present technology, a body hair region corresponding to body hair is detected from a process target image that includes skin. In addition, the structure of texture of the skin in the process target image is estimated. Further, the detected body hair region is interpolated based on the estimated structure of the texture. For this reason, the body hair can be removed from a skin image in consideration of the structure of the skin texture. Thus, the technology can be applied to cosmetology devices, medical devices, and the like, to ascertain the state of skin.

What is claimed is:

1. An image processing method comprising:
   estimating, by a processing device, a structure of skin texture in a process target image that includes skin; and
   interpolating, by the processing device, a body hair region corresponding to body hair from the process target image, based on the structure of the skin texture,
   wherein the estimating the structure of skin texture includes deciding a second threshold value for distinguishing a skin ridge pixel from a skin groove pixel, determining whether a skin pixel is a skin ridge pixel or a skin groove pixel in a determination region with a pixel of interest in the body hair region regarded as a reference using the second threshold value, and estimating whether the pixel of interest is a skin ridge pixel or a skin groove pixel according to a proportion of the skin ridge pixel to the skin groove pixel within the determination region; and
   comparing each pixel value of the process target image to a first threshold value for distinguishing a body hair pixel from a skin pixel based on the color distribution information, and performing detection of the body hair region.

2. The image processing method according to claim 1 wherein the detecting includes deciding a color conversion coefficient that makes color separation of the body hair region from another region easy, performing color conversion of the process target image using the color conversion coefficient, generating the color distribution information from the process target image that has undergone color conversion, and comparing each pixel value of the process target image that has undergone the color conversion to the first threshold value.

3. The image processing method according to claim 2, wherein the detecting includes generating a coefficient that has few errors in detecting the body hair region as the color conversion coefficient.

4. The image processing method according to claim 2, wherein the detecting includes deciding the color conversion coefficient and the first threshold value on a per-race basis.

5. The image processing method according to claim 1, wherein the detecting includes performing binarization on the process target image based on a result obtained by comparing each pixel value of the process target image to the first threshold value to generate body hair distribution information.

6. The image processing method according to claim 1, further comprising:
detecting the body hair region by performing region extension on the detected body hair region.

7. The image processing method according to claim 1, wherein the estimating the structure of skin texture includes estimating distribution of the skin ridge pixel and distribution of the skin groove pixel from distribution of luminance of a skin pixel in the process target image, and then deciding the second threshold value based on the estimation result.

8. The image processing method according to claim 1, wherein the estimating the structure of skin texture includes extending a size of the determination region when a skin pixel is not included in the determination region with the pixel of interest in the body hair region regarded as a reference.

9. The image processing method according to claim 1, wherein, when the pixel of interest is estimated to be a skin ridge pixel, the interpolating includes performing interpolation on the pixel of interest using a skin ridge pixel in a peripheral region of the pixel of interest, and when the pixel of interest is estimated to be a skin groove pixel, the interpolating includes performing interpolation on the pixel of interest using a skin groove pixel in the peripheral region.

10. The image processing method according to claim 9, wherein the interpolating includes setting a region size of the peripheral region according to a body hair width at a position of the pixel of interest.

11. The image processing method according to claim 10, wherein the interpolating includes determining a body hair main direction at the position of the pixel of interest, and then setting a size of a body hair region in a direction orthogonal to the body hair main direction to be the body hair width.

12. The image processing device according to claim 11, wherein the interpolating includes determining the size of the body hair region based on a number of body hair pixels consecutive with the pixel of interest within a direction determination region with the pixel of interest regarded as a reference.

* * * * *